US006734809B1

(12) United States Patent
Olodort et al.

(10) Patent No.: US 6,734,809 B1
(45) Date of Patent: May 11, 2004

(54) FOLDABLE KEYBOARD

(75) Inventors: Robert Olodort, Santa Monica, CA (US); John Tang, San Carlos, CA (US); Peter M. Cazalet, Campbell, CA (US); Sung Kim, Palo Alto, CA (US); Arturo Meuniot, San Francisco, CA (US); Paul Martin Donovan, Santa Clara, CA (US)

(73) Assignee: Think Outside, Inc., Santa Clara, CA (US)

( * ) Notice: Subject to any disclaimer, the term of this patent is extended or adjusted under 35 U.S.C. 154(b) by 0 days.

(21) Appl. No.: 09/540,669

(22) Filed: Mar. 31, 2000

Related U.S. Application Data

(60) Provisional application No. 60/127,651, filed on Apr. 2, 1999.

(51) Int. Cl.[7] .................. H03K 17/94; H03M 11/00
(52) U.S. Cl. .................. 341/22; 345/169; 400/472
(58) Field of Search .................. 341/22; 361/680, 361/681; 345/168, 169; 400/472, 482; 439/638

(56) References Cited

U.S. PATENT DOCUMENTS

| | | | |
|---|---|---|---|
| 3,499,515 A | 3/1970 | Mikrut | 197/98 |
| 3,574,335 A | 4/1971 | Ricke | 235/145 |
| 3,576,569 A | 4/1971 | Watson | 340/166 |
| 3,693,123 A | 9/1972 | Pedersen | 335/206 |
| 3,703,040 A | 11/1972 | Hill | 35/5 |
| 3,893,559 A | 7/1975 | Hishida et al. | 197/17 |
| 3,940,758 A | 2/1976 | Margolin | 340/337 |
| 4,066,850 A | 1/1978 | Heys, Jr. | 200/5 |
| 4,092,527 A | 5/1978 | Luecke | 364/709 |
| 4,336,530 A | 6/1982 | Koike et al. | 340/365 |

(List continued on next page.)

FOREIGN PATENT DOCUMENTS

| | | |
|---|---|---|
| EP | 0691603 | 1/1996 |
| GB | 2323331 | 9/1998 |
| JP | 04365115 | 12/1992 |
| JP | 08 044469 | 2/1996 |
| JP | 08190834 | 7/1996 |
| JP | 10293624 | 11/1998 |
| JP | 2000 056904 | 2/2000 |
| WO | WO 9704380 | 2/1997 |
| WO | WO 0010878 | 3/2000 |

OTHER PUBLICATIONS

European Search Report for Application No. EP 00 92 1541, mailed Jul. 17, 2003 (4 pages).
PCT Written Opinion Report for Int'l Appl. No. PCT/US00/08521 Mailed Jul. 31, 2001 (6pgs).
International Search Report, International Application No. PCT/US/00/08521, Jan. 8, 2001, 8 pages.
International Search Report of PCT application no. PCT/US98/24128, Mar. 31, 1999, 4 pages.
International Search Report of PCT application no. PCT/US98/24019, Apr. 20, 1999, 4 pages.
IBM Technical Disclosure Bulletin, "Compact Computer Keyboard", vol. 27, No. 10A, Mar. 1985, 4 pages.
IBM Technical Disclosure Bulleting, "Briefcase–Portable Textwriter with 100–Key Full–Size Keyboard," vol. 27, No. 4A, Sep. 1984, 3 pages.
IBM Technical Disclosure Bulletin, "Keyboard," vol. 27, No. 4B, Sep. 1984, 1 page.

*Primary Examiner*—Timothy Edwards
(74) *Attorney, Agent, or Firm*—Blakely, Sokoloff, Taylor & Zafman LLP

(57) ABSTRACT

A foldable keyboard having a plurality of folding keyboard sections. Each keyboard section includes a frame carrying a key set having a plurality of keys. The key set may be movable laterally relative to the frame. The frame with the key set is foldable with respect to an adjacent frame. The frame provides a self-contained enclosure for the keyboard assembly when fully closed. When opened, the keyboard assembly can be a full-size standard QWERTY keyboard.

30 Claims, 34 Drawing Sheets

U.S. PATENT DOCUMENTS

| | | | |
|---|---|---|---|
| 4,366,463 A | 12/1982 | Barker | 338/69 |
| 4,368,364 A | 1/1983 | Harbers, Jr. | 200/6 |
| 4,517,660 A | 5/1985 | Fushimoto et al. | 364/708 |
| 4,560,844 A | 12/1985 | Takamura et al. | 200/5 |
| 4,633,227 A | 12/1986 | Menn | 340/365 |
| 4,638,151 A | 1/1987 | Suwa | 235/145 |
| 4,661,005 A | 4/1987 | Lahr | 400/489 |
| RE32,419 E | 5/1987 | Rooney | 200/5 |
| 4,735,520 A | 4/1988 | Suzuki et al. | 400/488 |
| 4,818,828 A | 4/1989 | Curley et al. | 200/5 |
| 4,885,891 A | 12/1989 | Lynch | 52/646 |
| 4,914,999 A | 4/1990 | Masubuchi et al. | 84/423 |
| 4,939,514 A | 7/1990 | Miyazaki | 341/22 |
| 4,942,700 A | 7/1990 | Hoberman | 52/81 |
| 4,996,522 A | 2/1991 | Sunano | 340/700 |
| 5,024,031 A | 6/1991 | Hoberman | 52/81 |
| 5,044,798 A | 9/1991 | Roylance et al. | 400/472 |
| 5,122,786 A | 6/1992 | Rader | 340/711 |
| 5,137,384 A | 8/1992 | Spencer et al. | 400/489 |
| 5,141,343 A | 8/1992 | Roylance et al. | 400/472 |
| 5,163,765 A | 11/1992 | Levy | 400/492 |
| 5,164,723 A | 11/1992 | Nebenzahl | 341/23 |
| 5,167,100 A | 12/1992 | Krishnapillai | 52/109 |
| 5,187,644 A | 2/1993 | Crisan | 361/393 |
| 5,198,991 A | 3/1993 | Pollitt | 364/708 |
| 5,210,846 A | 5/1993 | Lee | 395/425 |
| 5,212,473 A | 5/1993 | Louis | 340/711 |
| 5,227,615 A | 7/1993 | Oogita | 235/440 |
| 5,252,971 A | 10/1993 | Franz et al. | 341/26 |
| 5,267,127 A | 11/1993 | Pollitt | 361/680 |
| 5,278,779 A | 1/1994 | Conway et al. | 400/472 |
| 5,287,245 A | 2/1994 | Lucente et al. | 361/680 |
| 5,329,079 A | 7/1994 | English et al. | 200/5 |
| 5,341,154 A | 8/1994 | Bird | 345/167 |
| 5,383,138 A | 1/1995 | Motoyama et al. | 364/708.1 |
| 5,394,959 A | 3/1995 | Cullity et al. | 187/244 |
| 5,398,326 A | 3/1995 | Lee | 395/425 |
| 5,398,585 A | 3/1995 | Starr | 84/646 |
| 5,422,447 A | 6/1995 | Spence | 200/5 |
| 5,424,728 A | 6/1995 | Goldstein | 341/22 |
| 5,436,792 A | 7/1995 | Leman et al. | |
| 5,454,652 A | 10/1995 | Huellemeier et al. | 400/489 |
| 5,457,453 A | 10/1995 | Chiu et al. | 341/22 |
| 5,459,461 A | 10/1995 | Crowley et al. | 400/491.1 |
| 5,476,332 A | 12/1995 | Cleveland, Jr. | 480/486 |
| 5,481,074 A | 1/1996 | English | 200/5 |
| 5,494,363 A | 2/1996 | Hochgesang | 400/472 |
| 5,502,460 A | 3/1996 | Bowen | 345/168 |
| 5,519,569 A | 5/1996 | Sellers | 361/680 |
| 5,532,904 A | 7/1996 | Sellers | 361/680 |
| 5,543,787 A | 8/1996 | Karidis et al. | 341/20 |
| 5,543,790 A | 8/1996 | Goldstein | 341/22 |
| 5,548,477 A | 8/1996 | Kumar et al. | |
| 5,557,057 A | 9/1996 | Starr | 84/617 |
| 5,574,481 A | 11/1996 | Lee | 345/168 |
| 5,575,576 A | 11/1996 | Roysden, Jr. | 400/472 |
| 5,587,875 A | 12/1996 | Sellers | 361/680 |
| 5,588,759 A | 12/1996 | Cloud | 400/472 |
| 5,590,020 A | 12/1996 | Sellers | 361/680 |
| 5,591,927 A | 1/1997 | Kawamura et al. | 84/171 |
| 5,596,480 A | 1/1997 | Manser et al. | 361/680 |
| 5,602,715 A | 2/1997 | Lempicki et al. | 361/680 |
| 5,612,691 A | 3/1997 | Murmann et al. | 341/22 |
| 5,635,928 A | 6/1997 | Takagi et al. | 341/22 |
| 5,644,338 A | 7/1997 | Bowen | 345/168 |
| 5,646,817 A | 7/1997 | Manser et al. | 361/680 |
| 5,648,771 A | 7/1997 | Halgren et al. | 341/22 |
| 5,653,543 A | 8/1997 | Abe | 400/489 |
| 5,654,872 A | 8/1997 | Sellers | 361/680 |
| 5,659,307 A | 8/1997 | Karidis et al. | 341/22 |
| 5,668,977 A | 9/1997 | Swanstrom et al. | |
| 5,677,826 A | 10/1997 | Sellers | 361/680 |
| 5,687,058 A | 11/1997 | Roylance | 361/680 |
| 5,703,578 A | 12/1997 | Allison | 341/22 |
| 5,706,167 A | 1/1998 | Lee | 361/680 |
| 5,712,760 A | 1/1998 | Coulon et al. | 361/680 |
| 5,733,056 A | 3/1998 | Meagher | 400/472 |
| 5,774,384 A | 6/1998 | Okaya et al. | 364/708.1 |
| 5,788,386 A | 8/1998 | Hayashi et al. | 400/489 |
| 5,800,085 A | 9/1998 | Lee | 400/489 |
| 5,841,635 A | 11/1998 | Sadler et al. | 361/749 |
| 5,845,137 A | 12/1998 | Tanaka | |
| 5,867,718 A | 2/1999 | Intrater et al. | |
| 5,878,276 A | 3/1999 | Aebli et al. | |
| 5,995,025 A | 11/1999 | Sternglass et al. | |
| 6,108,200 A | 8/2000 | Fullerton | |
| 6,147,858 A | 11/2000 | Takahashi | |
| 6,174,097 B1 | 1/2001 | Daniel | |
| 6,256,017 B1 | 7/2001 | Bullister | |

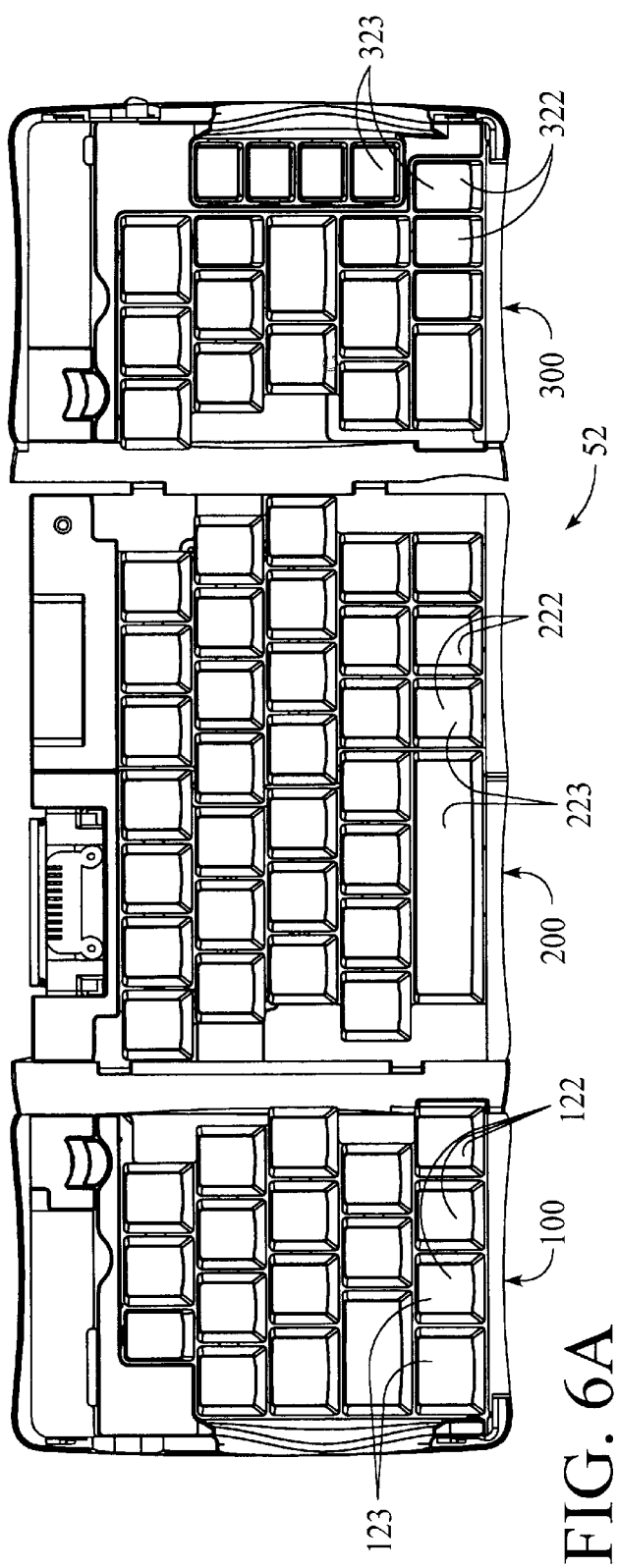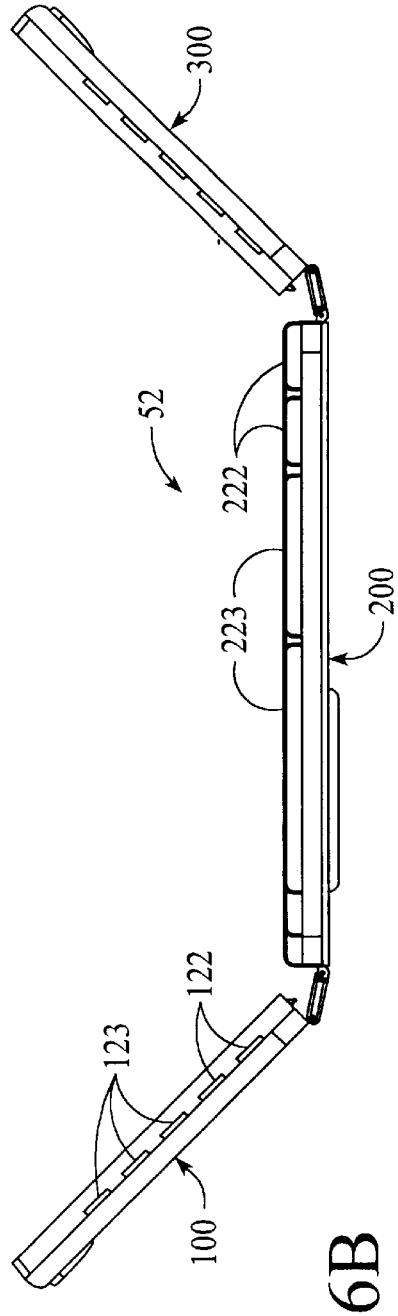
FIG. 6A
FIG. 6B

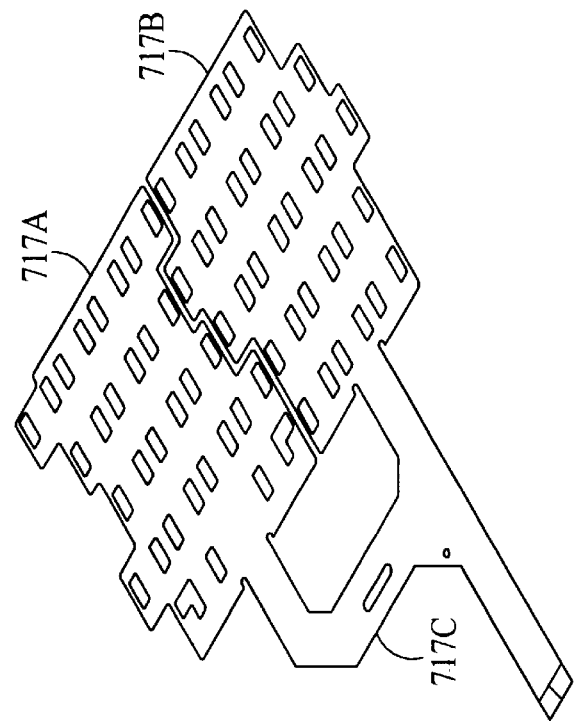
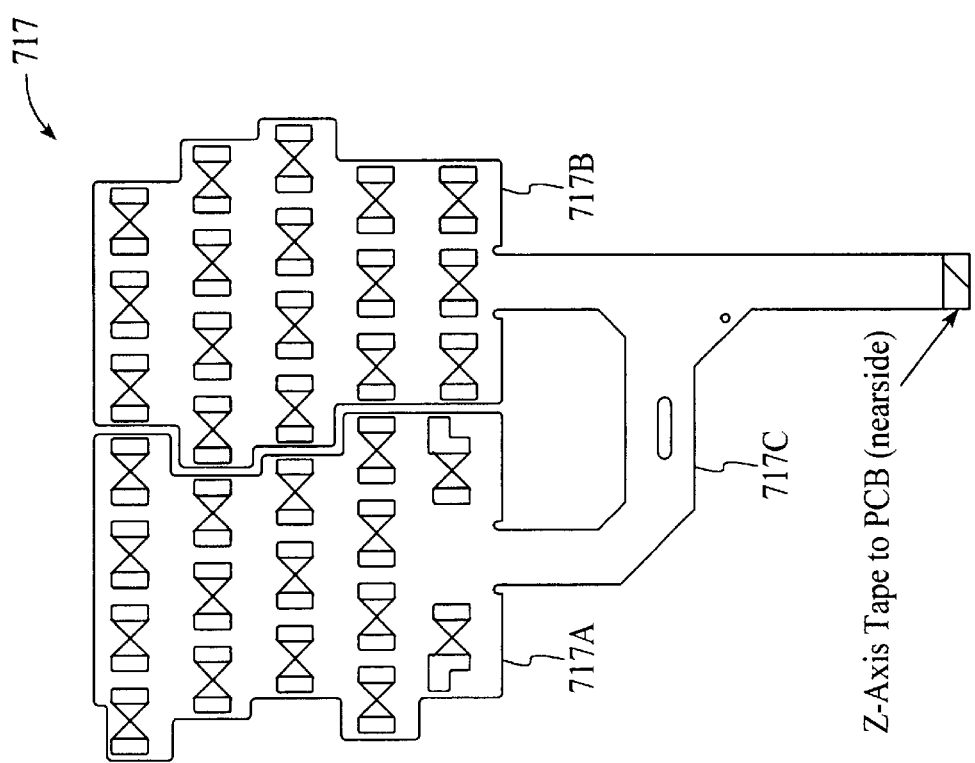
FIG. 30B
FIG. 30A

FOLDABLE KEYBOARD

This application is a continuation-in-part of provisional patent application Ser. No. 60/127,651 filed Apr. 2, 1999.

FIELD OF THE INVENTION

The invention relates generally to keyboard assemblies for information devices, and more particularly to foldable keyboards for such devices.

BACKGROUND OF THE INVENTION

Small portable computers such as "palmtops" can be conveniently carried in a pocket. Recent advances in shrinking the size of electronic components will soon allow these devices to perform all the functions of today's desktop computers. Additionally, a whole new category of "information appliances" has begun. These include portable wireless telephone/computers which can be used to access the Internet to send and receive e-mail and to interact on the World Wide Web. Also, personal digital assistant (PDA's) are becoming more and more popular.

Powerful and versatile as these devices are becoming, their use is greatly limited by non-existent or inadequate keyboards. Palmtops which rely on handwriting recognition have proven to be awkward, slow and error prone. Miniature keyboards commensurate with the size of small appliances are likewise frustrating, especially if the user needs to write something consisting of a few sentences or more. Voice recognition suffers from frequent errors and creates a lack of privacy when other people are near the speaker whose voice is being recognized. Further, voice recognition may not be used in all circumstances (e.g. the process of taking notes of a lecturer's lecture in an otherwise quiet auditorium may not be possible with voice recognition input systems but it is usually possible with a keyboard).

Keyboards for desktop and high quality laptop computers allow the user to comfortably, privately, quietly, and quickly "touch-type." They have a number of desirable features in common. Most keyboards have a standard "QWERTY" layout which requires no learning on the part of the user (once the user has become familiar with this layout). The keys, which usually number 84 for a laptop computer, have full-sized tops whose center-to-center spacing is about 0.75 inches for both the horizontal and vertical axes. The length of the keyboard (the distance from the left edge of the left-most key to the right edge of the right-most key) is about 11 inches. Any reduction in this spacing has proven to slow down and frustrate the touch-typist. Additionally, the keys of these keyboards have sufficient "travel," the distance the key moves when it is pressed, and tactile feedback, an over-center buckling action, that signals the user that the key has been pressed sufficiently.

Efforts have been made to provide keyboards that contain these features, yet collapse to a reduced size. Some designs only slightly reduce the size of "notebook" computers when folded. These are much larger than palmtop computers. IBM's "ThinkPad 701C" notebook computer folds in a single operation to reduce the keyboard case length (measured from the edges of its case) from 11.5 inches to 9.7 inches. Also see U.S. Pat. No. 5,543,787 which describes a foldable keyboard. U.S. Pat. No. 5,519,569 describes a keyboard which folds in multiple steps from a length of 10–11 inches to 6.125 inches. U.S. Pat. No. 5,654,872 describes a keyboard with keys that collapse when the lid is closed to allow a thinner notebook computer.

Other designs of keyboards include those where the keyboard is hinged at the center of its length and folds about a vertical axis. U.S. Pat. No. 5,457,453 describes a keyboard that folds to greater than half its length. U.S. Pat. No. 5,574,481 describes a keyboard that folds in half and appears to have a non-standard layout of keys (the keys on the center fold axis have edges which lie in a straight line). U.S. Pat. No. 5,653,543 describes a keyboard that folds in half. U.S. Pat. No. 5,502,460 describes a keyboard with two vertical hinges that folds to greater than half its unfolded length.

U.S. Pat. Nos. 5,044,798 and 5,141,343 describe keyboards whose keys have user-selectable variable spacing. These designs have non-standard layouts (e.g., the "Enter" key is rotated ninety degrees) and no self-containing housing.

Reducing the size of a keyboard by folding it is a challenging task because of the physical limitations of the materials that make up the parts of the keyboard assembly. For example, the keys usually include a plastic keytop having a thickness and a spring or support member below the keytop that has a height. The key is typically mounted to a base or a platform that includes a panel such as a printed circuit board or a membrane, which also has a thickness. A housing is usually provided to carry the key and its base and panel. The housing also has a thickness. The folded keyboard can be considerably thick when all the thicknesses and heights are added together and multiplied by the number of sections which are folded or stacked on one another. Advances have been made in the materials used for the parts of the keyboard to provide thinner plastic wall sections, for example. However, consumers desire portable devices that are sturdy and large enough to be easily used, yet can be conveniently carried or stored without taking up a large amount of space.

Keyboards electrically communicate information to information appliances. Most keyboards have printed circuit boards or membranes located underneath their keys. When a key is pressed it shorts the circuits in a particular column or row. The matrix of columns and rows that make up a keyboard is continually scanned by a controller to determine which keys have been pressed. Such an arrangement is described, for example, in U.S. Pat. No. 5,070,330. The electronic configuration of most keyboards thus necessitates a matrix of conductors that limits the collapsing of the keyboard to a certain size.

SUMMARY OF THE INVENTION

The present invention provides, in one embodiment, a foldable keyboard that includes keyboard sections that carry sets of keys on a frame. The frame provides a self-contained case for the keyboard assembly in its folded position. A standard key layout can be provided that is split between keyboard sections along a staggered line between adjacent sections. Each keyboard section includes a key set which includes a plurality of keys.

Through a unique hinge configuration and movable key sets in one embodiment, a foldable keyboard assembly is provided that folds into a small, portable package. The keyboard assembly can provide a standard size key layout which can be folded into a package small enough to fit into a shirt pocket, for example.

Numerous examples, aspects and embodiments of the invention are shown and described herein.

BRIEF DESCRIPTION OF THE DRAWINGS

The present invention is illustrated by way of example and not limitation in the figures of the accompanying drawings, in which like references indicate similar elements and in which:

FIG. 6a is a plan view of an embodiment of a keyboard assembly in accordance with the present invention;

FIG. 6b is an elevational view of the keyboard assembly of FIG. 6a showing keyboard sections in a partially folded position;

FIGS. 30a and 30b show an example of a flexible printed circuit for use with the two interior sections of a four section keyboard according to one embodiment of the present invention;

DETAILED DESCRIPTION

The invention relates to a keyboard assembly. Specific details of various embodiments of the keyboard assembly are described below. Numerous specific details including keyboard layouts, specific structural arrangements and relationships, etc. are presented in order to provide a thorough understanding of the invention. It is to be appreciated that these specific details need not be specifically employed to practice the invention.

Figure 1:
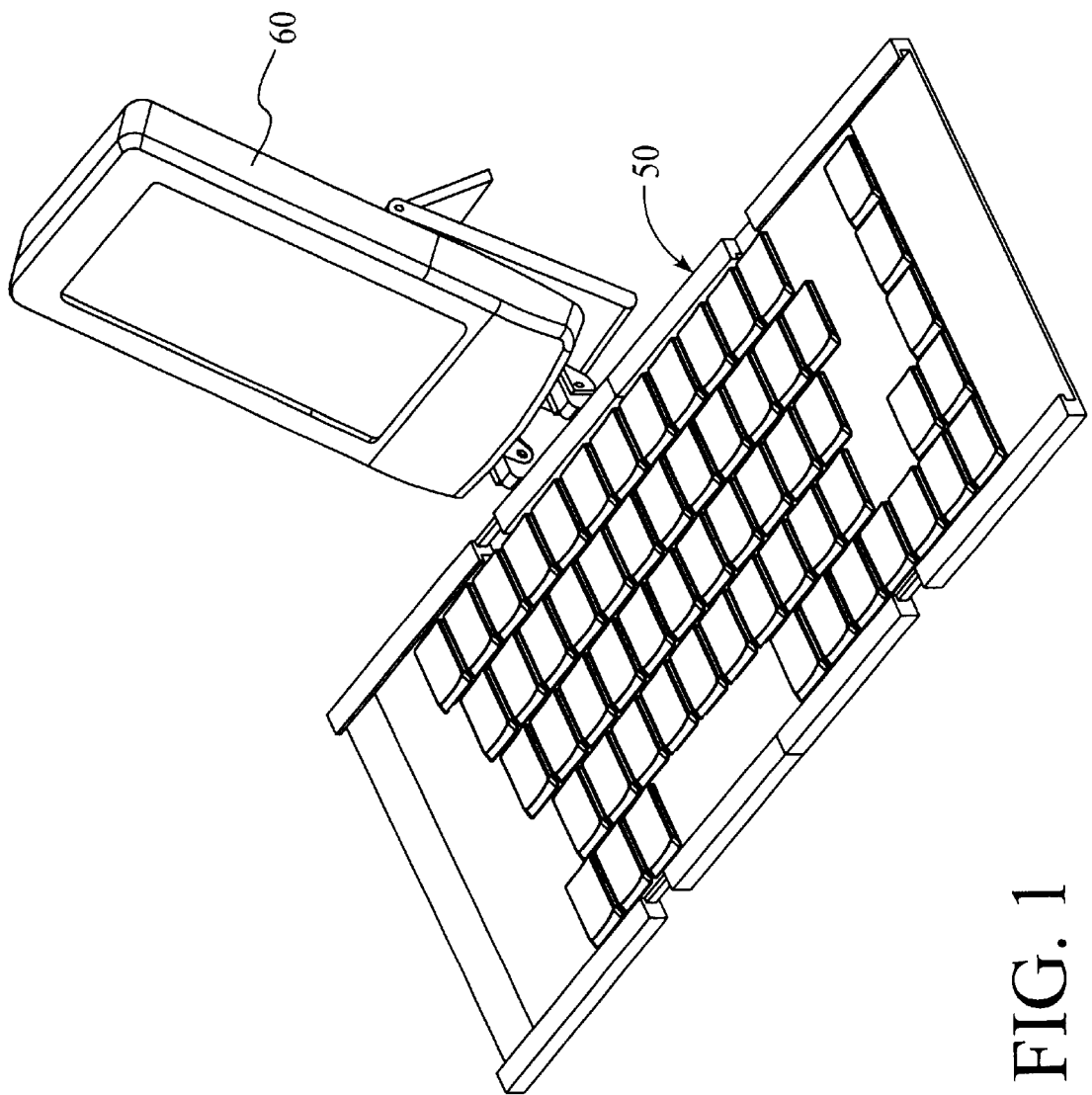
FIG. 1 is a perspective view of an embodiment of the keyboard assembly in its unfolded position and with an information device mounted thereto.

FIG. 1 shows a top perspective view of an embodiment of the keyboard assembly 50 of the invention. The keyboard assembly 50 is shown with an example of an information device 60 (e.g. a PDA such as a Palm PDA from Palm Computing) mounted thereto.

Figure 2:
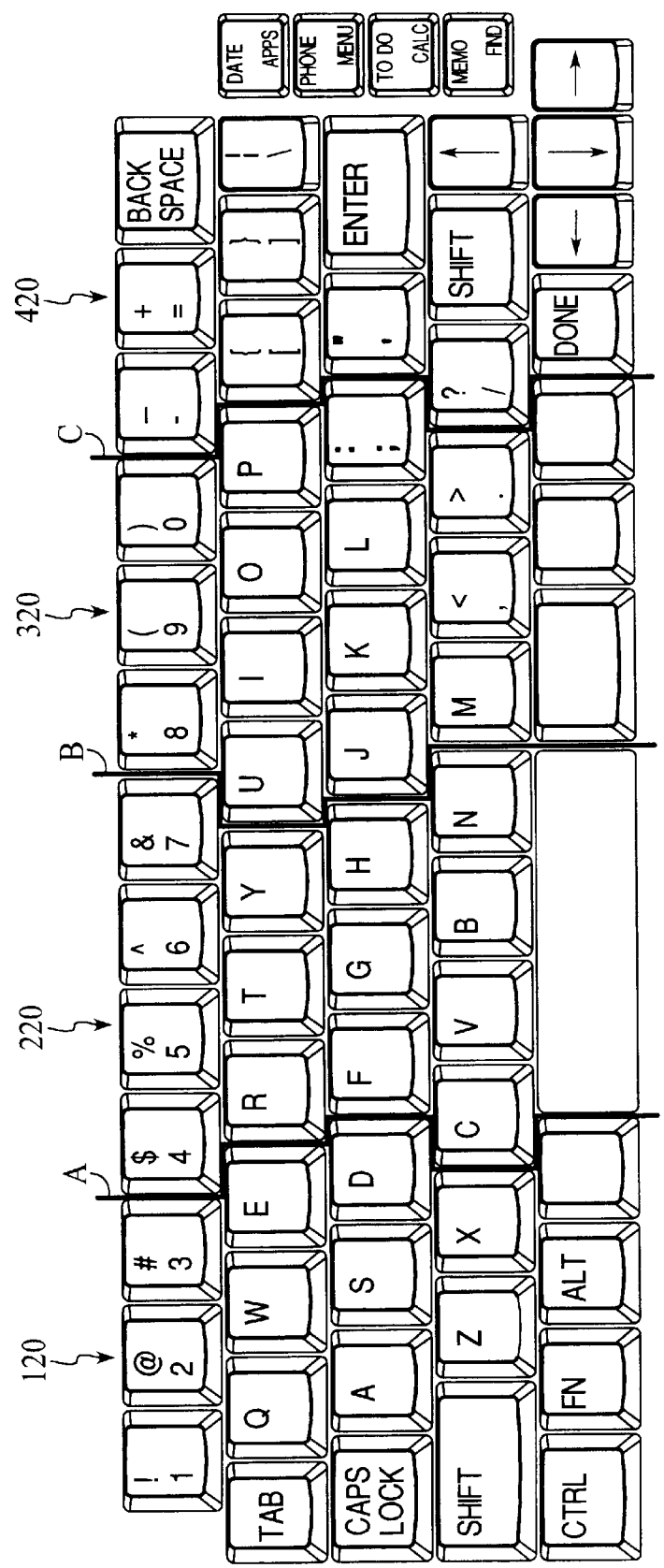
FIG. 2 is a plan view of a keyboard layout.

FIG. 2 illustrates an example of a keyboard key layout that can be used with the present invention. The lettering and symbols shown on the keys in FIG. 2 are provided for illustrative purposes only. FIG. 2 shows dividing line A between first key set 120 and second key set 220, dividing line B between second key set 220 and third key set 320, and dividing line C between third key set 320 and fourth key set 420. The dividing lines A, B, and C illustrate that the a standard keyboard layout has staggered rows of keys.

As described in further detail below, each key set includes a plurality of keys. The keys are preferably arranged in a standard QWERTY similar layout. The keys are divided into key sets along staggered dividing lines between key sets because the keys are not arranged in straight columns in a standard QWERTY keyboard. Each of first through fourth key sets is associated with a corresponding one of first through fourth keyboard sections described below.

Of course, the present invention can alternatively be embodied in non-QWERTY layouts such as, for example, key;layouts designed for a special purpose devices including workstations, information devices, cellular telephones, or software packages. While the present invention can be embodied in a full-size or standard size keyboard having a 19 millimeter pitch between keys, a reduced size keyboard can also embody the present invention, i.e. a scaled-down version of the foldable keyboard is contemplated.

Figure 3:
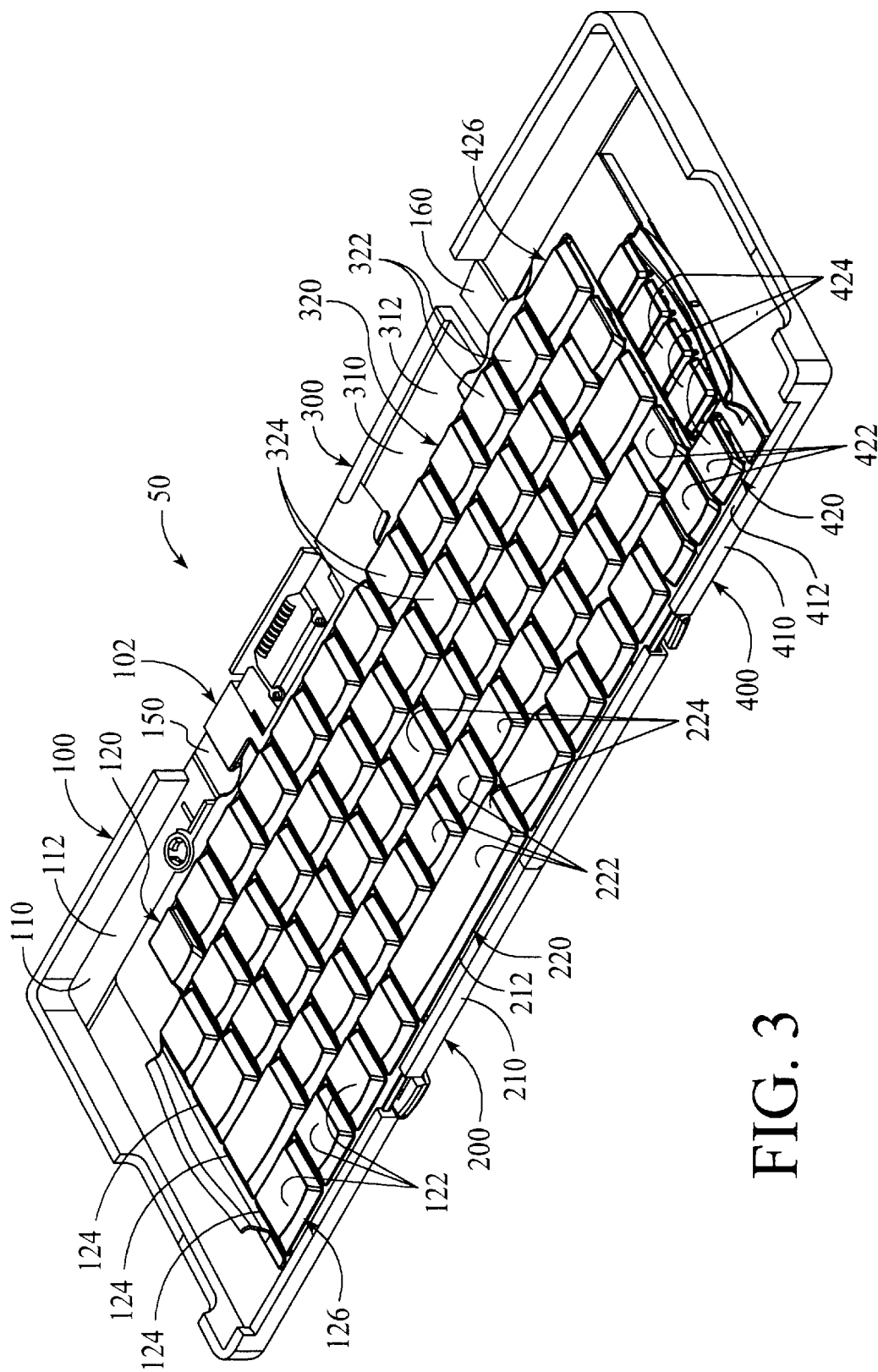
FIG. 3 is a perspective view of an embodiment of the keyboard assembly in its unfolded position.

FIG. 3 shows a top perspective view of the keyboard assembly 50 of FIG. 1 without the information device 60 attached. In FIG. 2, the keyboard assembly 50 is shown in its open and ready state.

FIG. 3 shows the keys of the keyboard in their operating position. The keyboard assembly 50 is foldable as described in detail below. In order to accomplish the folding of the keyboard assembly 50, the keys of the keyboard are preferably divided into four key sets. The keyboard assembly 50, shown in FIG. 3, is divided into four keyboard sections. FIG. 3 shows first keyboard section 100 next to second keyboard section 200, which in turn is next to third keyboard section 300, which in turn is also next to fourth keyboard section 400.

As shown in FIG. 3, keyboard assembly 50 is shown in its unfolded position 102. First keyboard section 100 is shown as the left-most section. First keyboard section 100 includes a first frame 110. First frame 110 has first key set 120 on top side 112 of first frame 110. First key set 120 includes a plurality of first keys 122 arranged in a plurality of first rows 124. First keyboard section 100 is illustrated in FIG. 3 in its operating position 126 which is the position adjacent second keyboard section 200. Also, first keyboard section 100 is attached in a plane to second keyboard section 200 when the first keyboard section 100 is in operating position 126.

FIG. 3 also shows second keyboard section 200 which includes second frame 210. A second key set 220 is on the top side 212 of the second frame 210. Second key set 220 includes a plurality of second keys 222 arranged in a plurality of second rows 224.

Similarly, a third keyboard section 300 is shown in FIG. 3 attached to second keyboard section 200. Third keyboard section 300 is generally in a plane relative to second keyboard section 200 when keyboard assembly 50 is unfolded. Third keyboard section 300 also includes a third frame 310. A third key set 320 is on the third frame 310. Third key set 320 includes a plurality of third keys 322, which are also arranged in a plurality of third rows 324.

Fourth keyboard section 400 is shown as the right-most keyboard section of keyboard assembly 50 in FIG. 3. Fourth keyboard section 400 includes a fourth frame 410 which has a fourth key set 420 on its top side 412. Fourth key set 420 includes a plurality of fourth keys 422 arranged in a plurality of fourth rows 424. Fourth keyboard section 400 is attached in a plane to third keyboard section 300 when fourth keyboard section 400 is in an operating position 426.

Figure 4:
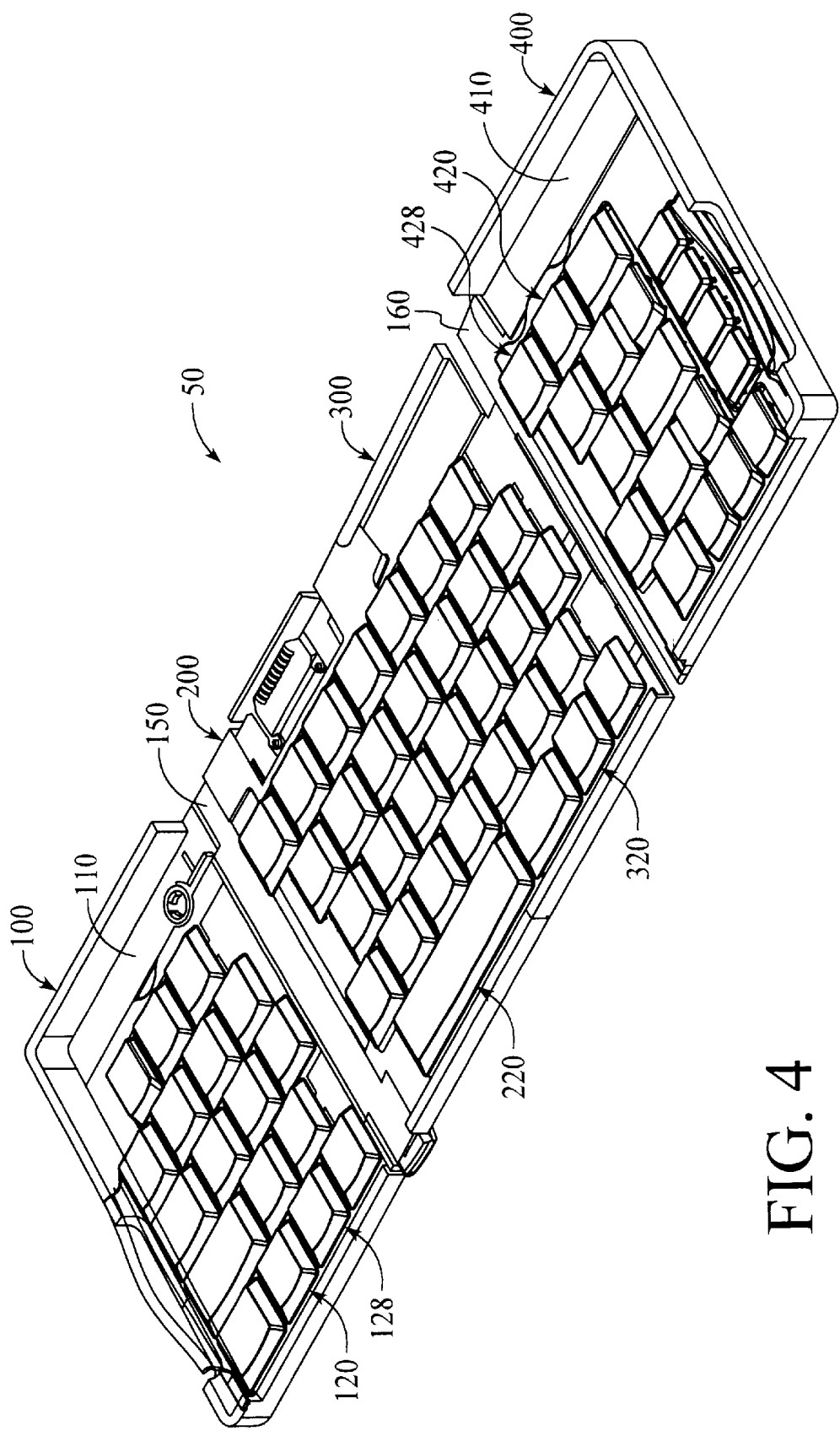
FIG. 4 is a perspective view of the keyboard assembly showing key sets moved laterally.
Figure 5A:
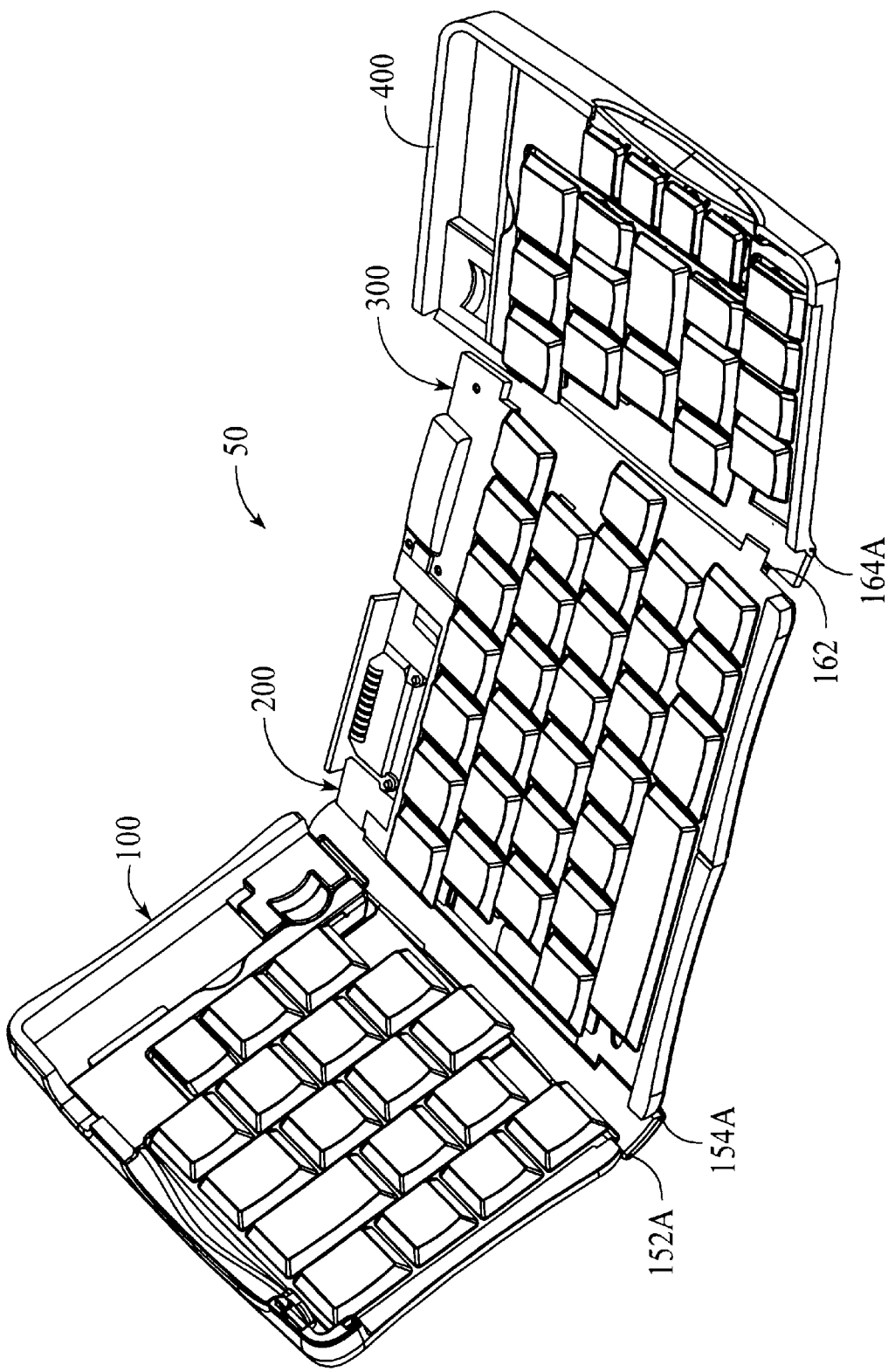
FIG. 5a is a perspective view of the keyboard assembly showing keyboard sections partially folded.
Figure 5B:
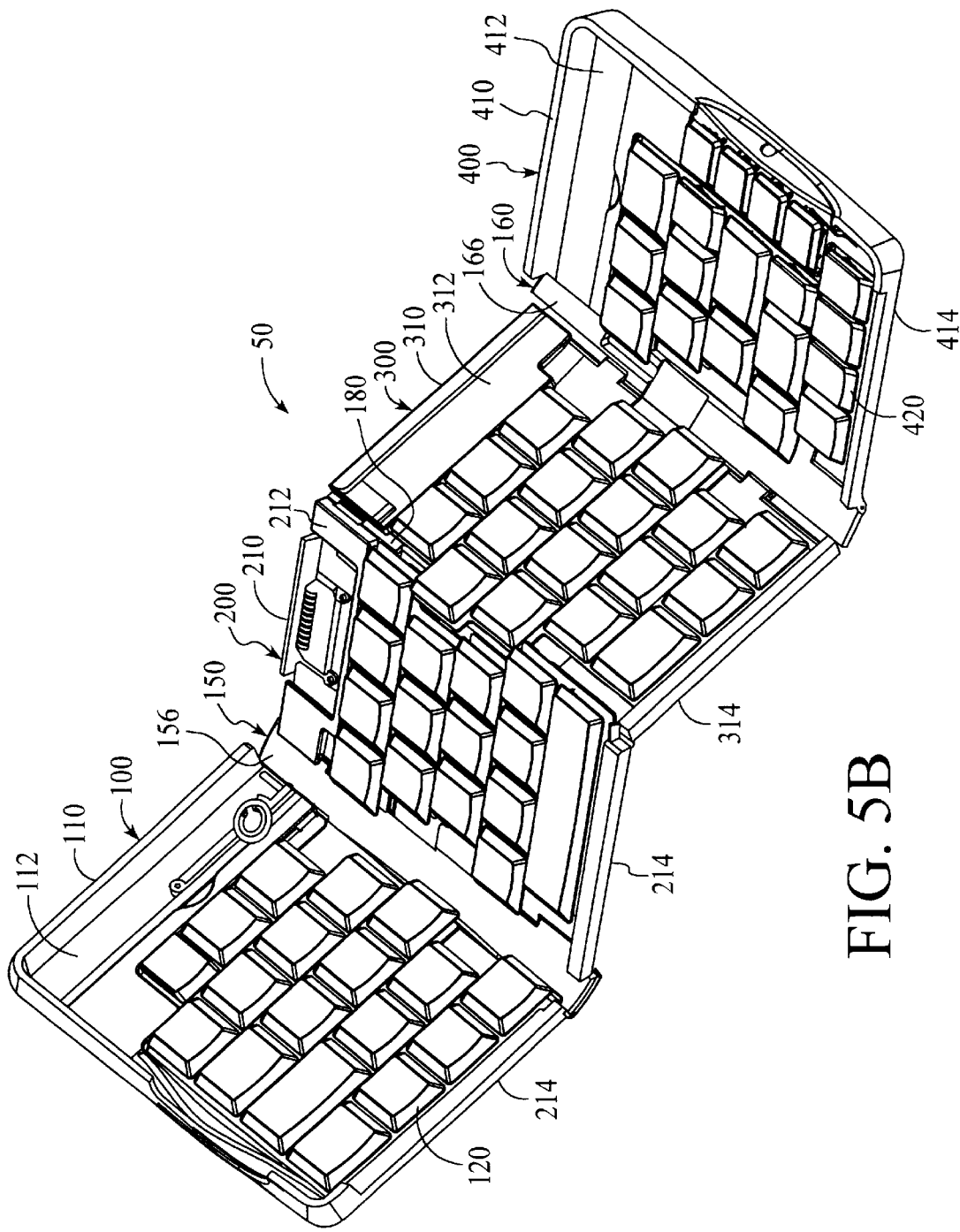
FIG. 5b is a perspective view of the keyboard assembly in a partially folded state.

FIGS. 4, 5*a*, and 5*b* show keyboard assembly 50 in various intermediate positions between the unfolded position shown in FIG. 3 and before the assembly is completely folded.

FIG. 4 shows first key set 120 and fourth key set 420 in their respective separated positions 128 and 428 after having been moved laterally relative to the first frame 110 and the fourth frame 410, respectively. FIG. 4 also shows first hinge 150 connecting first keyboard section 100 to second keyboard section 200. Second hinge 160 is shown connecting keyboard section 300 to keyboard section 400.

As shown in FIG. 4, first key set 120 and fourth key set 420 are laterally movable with respect to first frame 110 and fourth frame 410, respectively. When the keyboard assembly 50 is placed in its unfolded position, first key set 120 and fourth key set 420 are moved laterally inwardly toward the second key set 220 and the third key set 320, respectively (see FIG. 3). In the operating position, in which first and fourth key sets 120 and 420 are moved inwardly, first key set 120 is positioned over first hinge 150, and fourth key set 420 is positioned over second hinge 160 (FIG. 3). The first keyboard section 100 and fourth keyboard section 400 thus prevent the keyboard from being folded at first and second hinges 150 and 160. First key set 120 and fourth key set 420 are laterally moved outwardly by the operator of the keyboard in preparation for folding the keyboard. As first and fourth key sets are moved laterally outwardly, first and second hinges 150 and 160 are exposed. When first and second hinges 150 and 160 are exposed, a gap is created between adjacent key sets (i.e. between the first and second key sets 120 and 220 and between the third and fourth key sets 320 and 420). When the gap is created, the first and fourth keyboard sections 100 and 400 can be folded toward their respective second and third keyboard sections 200 and 300. The staggered edge of each of the first and fourth key set that is adjacent to the first or second hinge, respectively, remains staggered, but is moved away from the hinge to allow the keyboard section to be folded about its respective hinge. The staggered edge of each of the second and third key set that is adjacent to the first or second hinge, respectively, also remains staggered. In the embodiment shown in FIG. 4, the break between the first key set 120 and the second key set 220 is located such that the staggered edge of the second key set 220 is inward with respect to the first hinge 150. Likewise, the break between the third key set 320 and located such that the staggered edge of the third key set 320 is inward with respect to the second hinge 160. A gap is created between the adjacent key sets so that the adjacent sections can be folded with respect to each other. The lateral movement of key sets 120 and 420 to their respective separated positions allows the respective top sides of the adjacent keyboard sections to be folded toward each other. Preferably, the pivot points of the double hinges 150 and 160 correspond to the bottom sides of the frames.

Figure 27A:
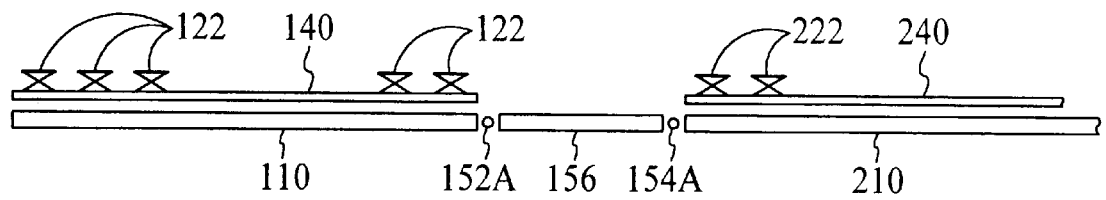
FIGS. 27a, 27b, and 27c show, through side views, three different positions of a set of slidable keys relative to a double hinge on a collapsible keyboard according to one embodiment of the invention.
Figure 27B:
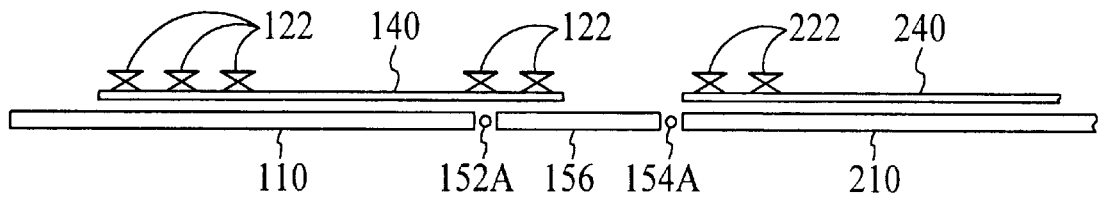
Figure 27C:
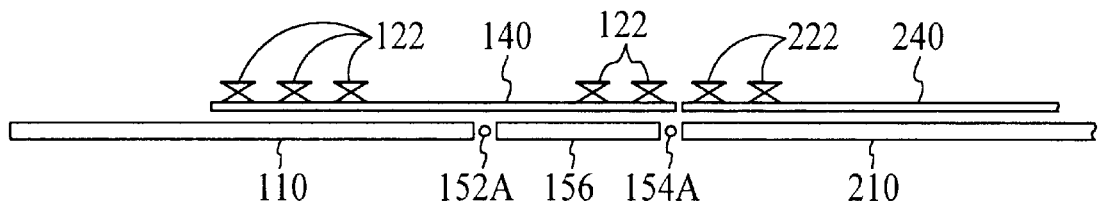

FIGS. 27a, 27b and 27c show the lateral movement of a first set of keys on a first base 140 relative to the first frame 110 and the hinge member 156 which includes at least two axles 152a and 154a. FIG. 27a shows the base 140 positioned to allow the keyboard to be collapsed as the base 140 with its set of keys has been moved laterally by sliding the base 140 away from the base 240 to open up the region around the double hinges which include the axles 152a and 154a. FIG. 27c shows the first base having been moved next to the second base 240 such that it now covers the double hinge area which includes the hinge member 156 and the axles 152a and 154a. In this position, the keyboard is ready for use (although there is nothing preventing the keyboard from being used in one embodiment when the base 140 is positioned as shown in FIGS. 27b or 27a). FIG. 27b shows the base 140 in an intermediate position between the positions shown in FIGS. 27a and 27c. Thus, as shown in FIGS. 27a, 27b and 27c, the first base 140 may be moved relative to the double hinge area and the second base 240 to allow for the keyboard to be collapsed in one configuration shown in FIG. 27a and moved into a use position as shown in FIG. 3 in which the first key set on the base 140 is adjacent to the second key set on the base 240 as shown in FIGS. 3 and 27c.

FIG. 5a shows first keyboard section 100 detached from second keyboard section 200 and being folded toward second keyboard section 200. Also, fourth keyboard section 400 is shown detached from third keyboard section 300 and being folded toward third keyboard section 300. First and fourth keyboard sections 100 and 400 can be considered to be attached to their respective adjacent second and third keyboard sections 200 and 300 when their adjacent edges are either in contact or cooperating when the keyboard assembly is in the unfolded position, as shown in FIG. 2. The keyboard sections are considered detached from each other when they are moved to a relative position other than coplanar such that their adjacent edges are no longer in contact or cooperating even though they may be hingedly connected. Also, the keyboard sections can be completely physically detached from each other and yet folded over each other when the keyboard is in its folded state.

FIG. 5b shows second keyboard section 200 and third keyboard section 300 in a partially folded position relative to each other.

Thus, the method of folding the keyboard assembly 50 includes moving first key set 120 laterally away from second key set 220, moving fourth key set 420 laterally away from third key set 320, folding first keyboard section 100 toward second keyboard section 200, folding fourth keyboard section 400 toward third keyboard section 300, and folding keyboard sections 200 and 300 toward each other. The method can further include compressing the keys either partially or completely (or the biasing members below the keytops) as described in further detail below, resulting in an electrical shorting in each compressed key.

The embodiment shown in FIG. 5b shows first and second keyboard sections 100 and 200 folding top side to top side. Also, third and fourth keyboard sections 300 and 400 are shown folding top side to top side. FIG. 5b also shows second and third keyboard sections 200 and 300 folding bottom side to bottom side. Of course, any combination of folding adjacent sections top side to top side, bottom side to bottom side, or top side to top side may be provided with different hinge configurations.

Figure 5C:
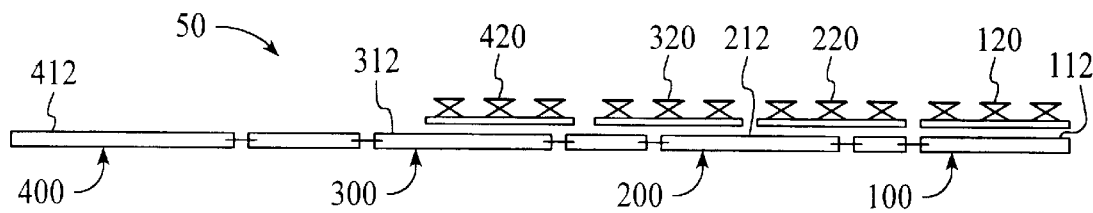
FIG. 5c is an elevational view of an embodiment of the keyboard assembly in its unfolded position with key sets in their operating positions.

FIGS. 5c through 5g show one such configuration. Keyboard assembly 50 is shown in an unfolded position in FIGS. 5c and 5d. FIG. 5c shows first keyboard section 100, second keyboard section 200, third keyboard section 300, and fourth keyboard section 400 in a plane. First keyboard section 100 has a first top side 112, second keyboard section 200 has a second top side 212, third keyboard section 300 has a third top side 312, and fourth keyboard section 400 has a fourth top side 412. FIG. 5c also shows first key set 120, second key set 220, third key set 320, and fourth key set 420 in an operating position on keyboard assembly 50 wherein each key set is relatively close to an adjacent key set.

Figure 5D:
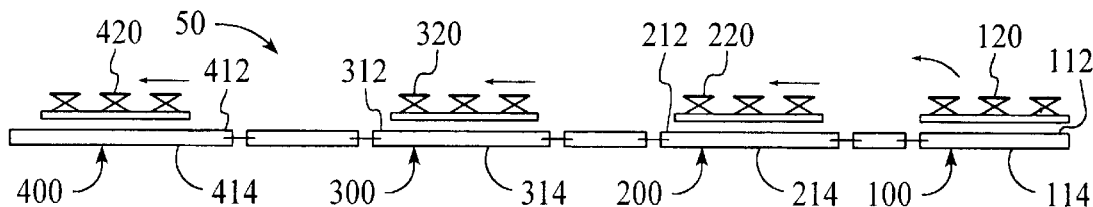
FIG. 5d is an elevational view of the keyboard assembly of FIG. 5c with key sets moved laterally.

FIG. 5d shows that each key set is moved laterally to a separated position with respect to adjacent key sets in preparation for folding of the assembly 50. Each key set is moved to a location generally aligned with its corresponding keyboard section. For example, fourth key set 420 is shown moved laterally to its separated position on fourth keyboard section 400.

Figure 5E:
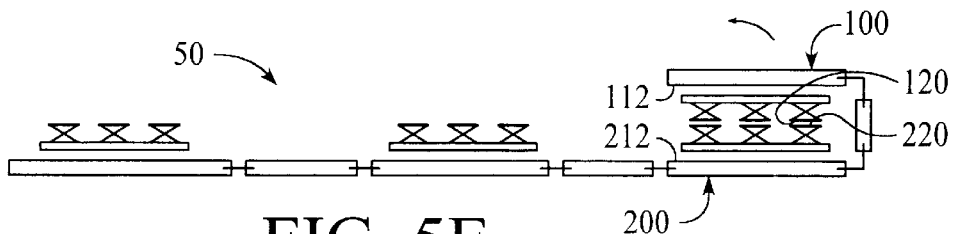
FIGS. 5e and 5f show the keyboard assembly of FIG. 5c in partially folded positions.
Figure 5F:
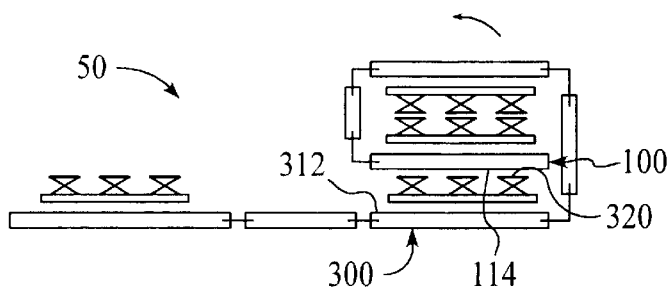
Figure 5G:
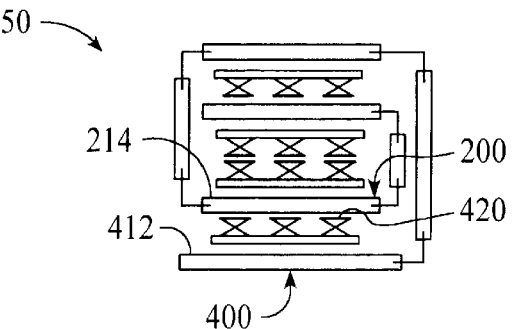
FIG. 5g shows the keyboard assembly of FIG. 5c in its fully folded position.

FIGS. 5e through 5g show keyboard assembly 50 in various stages of being folded. Keyboard assembly 50 is folded by first folding a first keyboard section 100 (or frame) having a first top side 112 and a first bottom side 114 and carrying a first key set 120 over a second keyboard section 200 (or frame) having a second top side 212 and a second bottom side 214 and carrying a second key set 220 such that the first top side 112 faces the second top side 212 (FIG. 5e). Then, the first and the second sections are together folded over a third keyboard section 300 (or frame) having a third top side 312 and a third bottom side 314 and carrying a third key set 320 such that the first bottom side 114 faces the third top side 312 (FIG. 5f). Next, the first, second, and third keyboard sections are together folded over a fourth keyboard section 400 (or frame) having a fourth top side 412 and carrying a fourth key set 420 such that the second bottom side 214 faces the fourth top side 412 (FIG. 5g). As described above, first, second, third, and fourth key sets include a plurality of keys that can be substantially compressed when assembly 50 is in the folded position as in FIG. 5g.

Referring again to FIG. 5b, a top perspective view is shown of keyboard assembly 50 in a partially open, i.e. partially folded, position. The top side 112 of the first frame 110 is shown in FIG. 5b as being folded toward top side 212 of second frame 210. In the embodiment illustrated in FIG. 5b, the first keyboard section 100 is pivotally attached to the second keyboard section 200. Second keyboard section 200 is in turn pivotally attached to third keyboard section 300 by center hinge 180. As shown in FIG. 5b, second frame 210 is pivoted, toward third frame 310 such that bottom side 214 of second frame folds toward bottom side 314 of third frame 310.

Also shown in FIG. 5b is the fourth keyboard section 400 being folded toward third keyboard section 300 such that top side 412 of fourth frame 410 is folded toward top side 312 of frame 310. Third keyboard section 300 is preferably pivotally attached to fourth keyboard section 400 by second hinge 160.

Referring again to FIGS. 4 and 5b, first key set 120 and fourth key set 420 are moved laterally with respect to first frame 110 and fourth frame 410, respectively. The first and fourth key sets are moved laterally so that the keyboard assembly can be folded between the first keyboard section and the second keyboard section and also between the third keyboard section and the, fourth keyboard section. In the preferred embodiment, first hinge 150 and second hinge 160 are double axle hinges. Hinge 150 includes a first hinge member 156 between its axles. First hinge 150 includes first hinge member 156 between its axles, and second hinge 160 includes second hinge member 166 between its axles.

In the example shown in FIGS. 5a and 5b, first keyboard section 100 is folded toward second keyboard section 200 and fourth keyboard section 400 is folded toward third keyboard section 300. In the case of the second keyboard section 200 and its adjacent third keyboard section 300, the staggered break between second key set 220 and third key set 320 is generally located above the axis of center hinge 180. Since center hinge 180 is a single axle hinge, and the pivot axis of center hinge 180 is aligned with the bottom sides 214 and 314, the bottom side 214 of second frame 210 can be folded toward the bottom side 314 of third frame 310. When second frame 210 and third frame 310 are completely folded, bottom sides 214 and 314 preferably are in contact against each other.

FIGS. 6a and 6b illustrate an embodiment of keyboard assembly 52 in which two outer keyboard sections are folded over an inner keyboard section. A first keyboard section 100 includes a plurality of first keys 122. Each of the plurality of first keys 122 has a first keytop 123. A second keyboard section 200 is provided which includes a plurality of second keys 222, each of the plurality of second keys 222 has a second keytop 223. A third keyboard section 300 is attached to the second keyboard section 200. The third keyboard section 300 includes a plurality of third keys 322. Each of the plurality of third keys 322 has a third keytop 323.

FIGS. 6a and 6b illustrate the first keyboard section 100 being folded over such that the plurality of first keys 122 will face the plurality of second keys 222 once the first keyboard section 100 is completely folded. Also the third section 300 is preferably attached to the opposite side of the second keyboard section 200 in a similar manner as that of the first keyboard section 100. In one embodiment, the first keyboard section 100 and the third keyboard section 300 are detachable from the second keyboard section 200 such that the first and third keyboard sections 100 and 300 can be moved to a storage position in which the first keytops 123 and third keytops 323 contact the second keytops 223 of the second keyboard section 200.

Each of the plurality of keys of each of the first, second and third keyboard sections includes a biasing member under each respective keytop. The biasing members provide a biasing force that pushes upwardly on each key. When the keyboard sections are detached from each other and moved to a storage position, or when the keyboard sections are folded over each other such that the respective keytops contact each other, the biasing members under the keys can be compressed in order to provide a folded package having a minimal thickness.

Figure 6C:
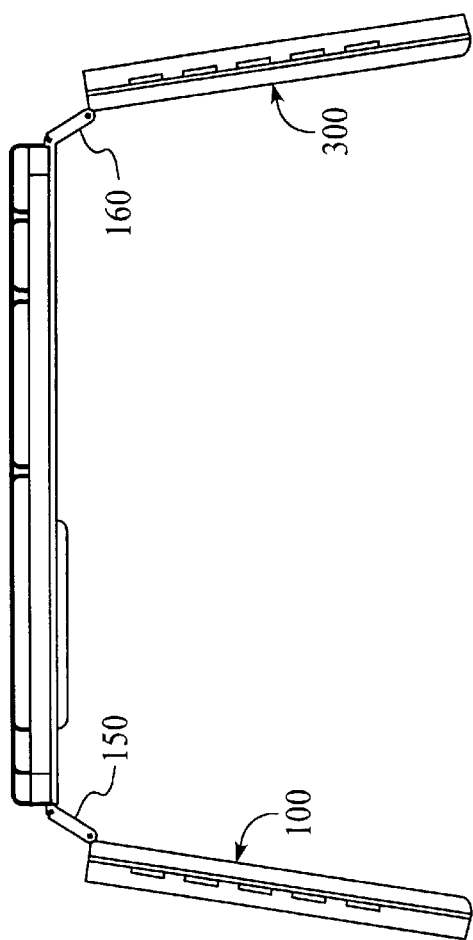
FIG. 6c is an elevational view of the keyboard assembly of FIG. 6a showing keyboard sections partially folded in an opposite direction.
Figure 6E:
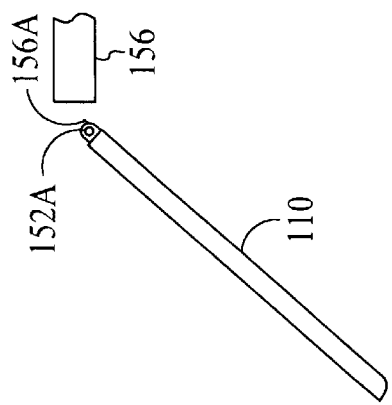
FIGS. 6d and 6e show an example of a mechanism which resists movement in this opposite direction but does allow it if there is sufficient force.
Figure 6D:
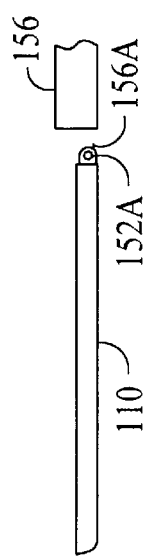

FIGS. 6c, 6d and 6e show an example of an embodiment of the present invention in which movement of the outer sections in a direction opposite to that shown in FIG. 5a is permitted. FIG. 6c shows an example of a four section keyboard after movement in this opposite direction. FIGS. 6d and 6e show an example of a mechanism for resisting this movement in order to keep the keyboard generally flat in use but which will allow movement in this opposite direction in order to preserve the mechanics of the keyboard without breaking the keyboard. As shown in FIGS. 6d and 6e (which show only the left outer section and one of the interior sections of a multiple section keyboard), the first frame 110 includes a hinge element which contains an axle 152a and a ridge 156a which is designed to engage the hinge member 156. Under normal, non-excessive pressures, the hinge member 156 engages the ridge 156a such that movement beyond the position shown in FIG. 6d is resisted by the engagement of the ridge 156a with the hinge member 156. However, if sufficient force is applied in the opposite direction, then the ridge 156a will move past the hinge member 156, allowing the first frame 110 to be moved downwardly into the position shown in FIG. 6e or 6c.

Figure 7:
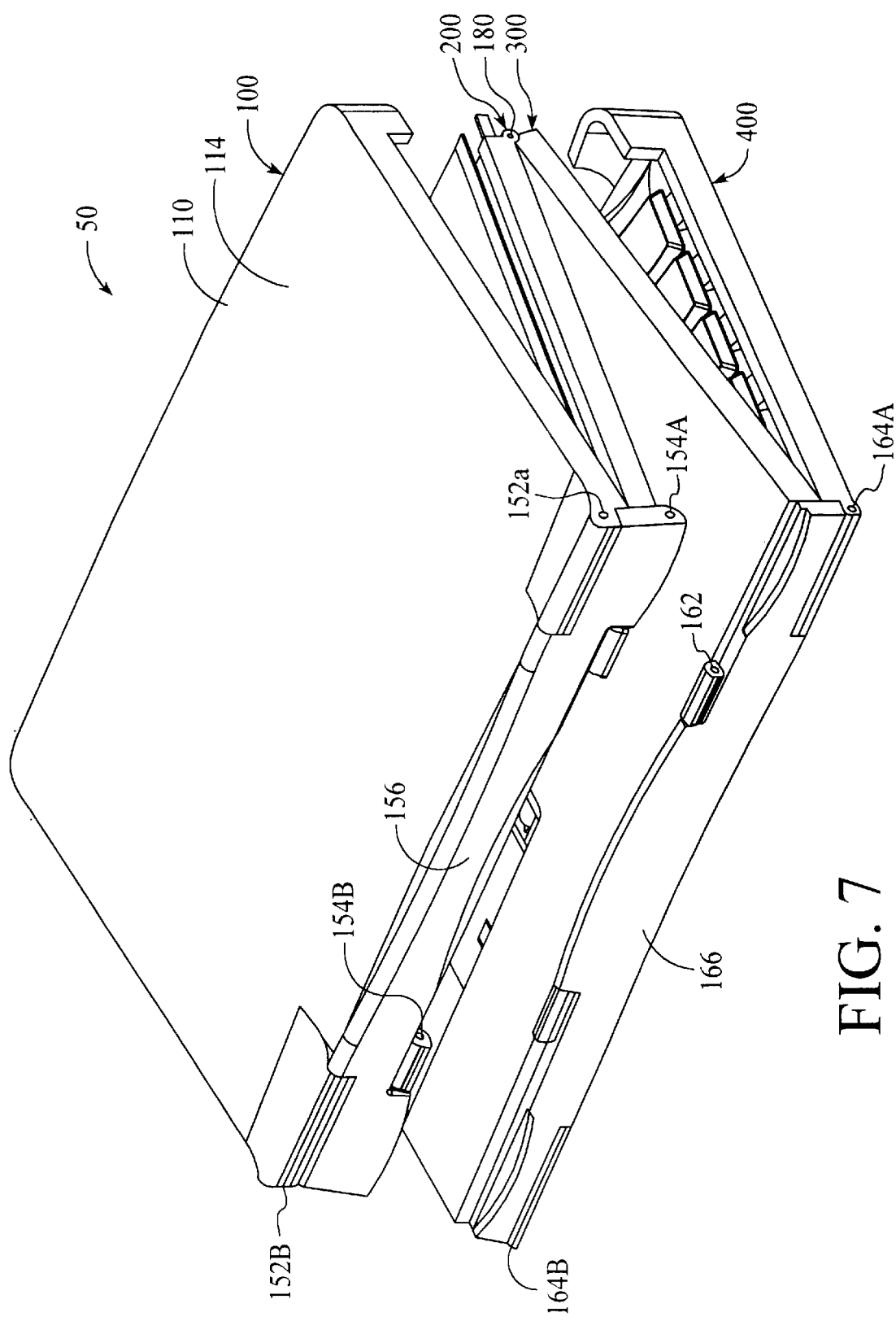
FIG. 7 is a perspective view of the keyboard assembly of FIG. 2 in a partially folded position.

FIG. 7 shows keyboard assembly 50 in a nearly closed position. First keyboard section 100, second keyboard section 200, third keyboard 300, and fourth keyboard section 400, are each shown folded with respect to their respective adjacent keyboard sections. Bottom side 114 of first frame 110 provides a protective wall for the keyboard assembly 50 in its folded or storage position. Similarly, bottom side 414 (not shown) provides a protective wall or surface for the opposite side of the keyboard assembly 50 in its storage or folded position. First hinge member 156 and second hinge member 166 provide side wall portions for the folded assembly.

Figure 17:
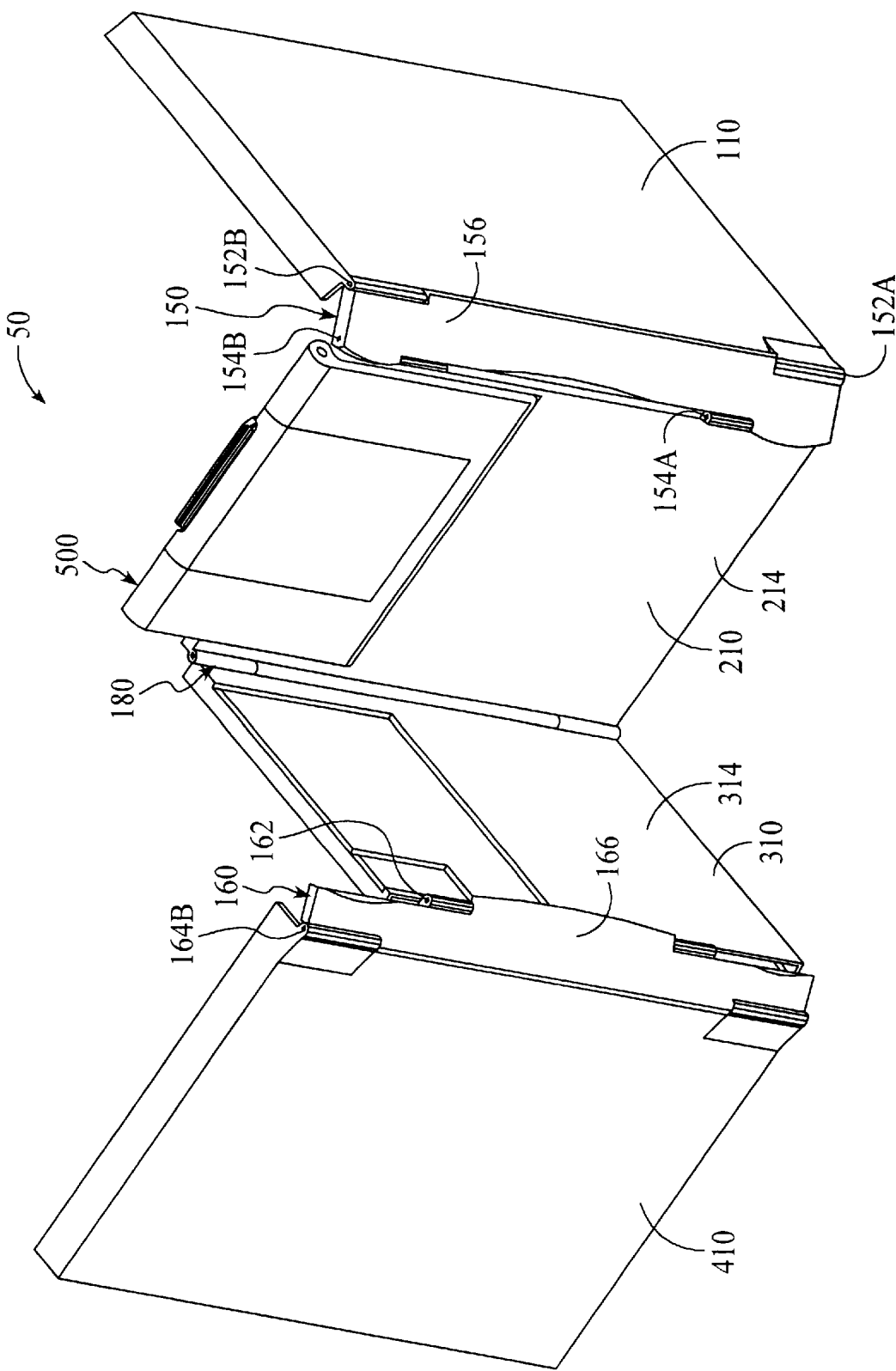
FIG. 17 is a rear perspective view of the keyboard assembly in a partially folded position.

FIG. 7 shows certain details with respect to the positions of the axles relative to both double hinge members. It can be seen from FIG. 7 as well as FIGS. 9, 11, 12, and 14 how the hinge points nest tightly together to form a substantially enclosed container when the keyboard is completely collapsed. FIG. 7 shows the keyboard before it is completely collapsed while FIGS. 9, 11, 12 and 14 show the keyboard in its completely collapsed form. The double hinge member between the first frame 110 and the second frame 210 includes a hinge member 156 which is coupled to four axles as shown in FIG. 7. Axles 152a and 152b are disposed in cylindrical openings on the first frame 110. These axles are also partially disposed in cylindrical openings in the hinge member 156. The hinge member 156 is coupled to the second frame 210 by the two axles 154a and 154b which are disposed in cylindrical openings of the hinge member 156 and in cylindrical openings of the second frame 210 in order to secure the hinge member 156 to the second frame 210. ;As can be seen from FIG. 7, there is an opening in the hinge member 156 which is designed to match a protrusion in the second hinge member 166 which protrusion includes an axle 162 that extends through cylindrical openings in the third frame 310 as well as cylindrical openings in the second hinge member 166 in order to secure the second hinge member 166 to the third frame 310. The second hinge member 166 also includes a cylindrical opening to receive the axles 164a and 164b which are also disposed within cylindrical openings in the fourth frame 410. It can be seen from FIGS. 12 and 14 that the axles 154a, 154b and 162 line up substantially in a plane with the axle 180 when the keyboard is in the substantially collapsed configuration. FIG. 17 provides a further view of the manner in which the hinge points which include the associated axles nest when closing the four section keyboard shown in FIGS. 7 and 17.

Figure 8:
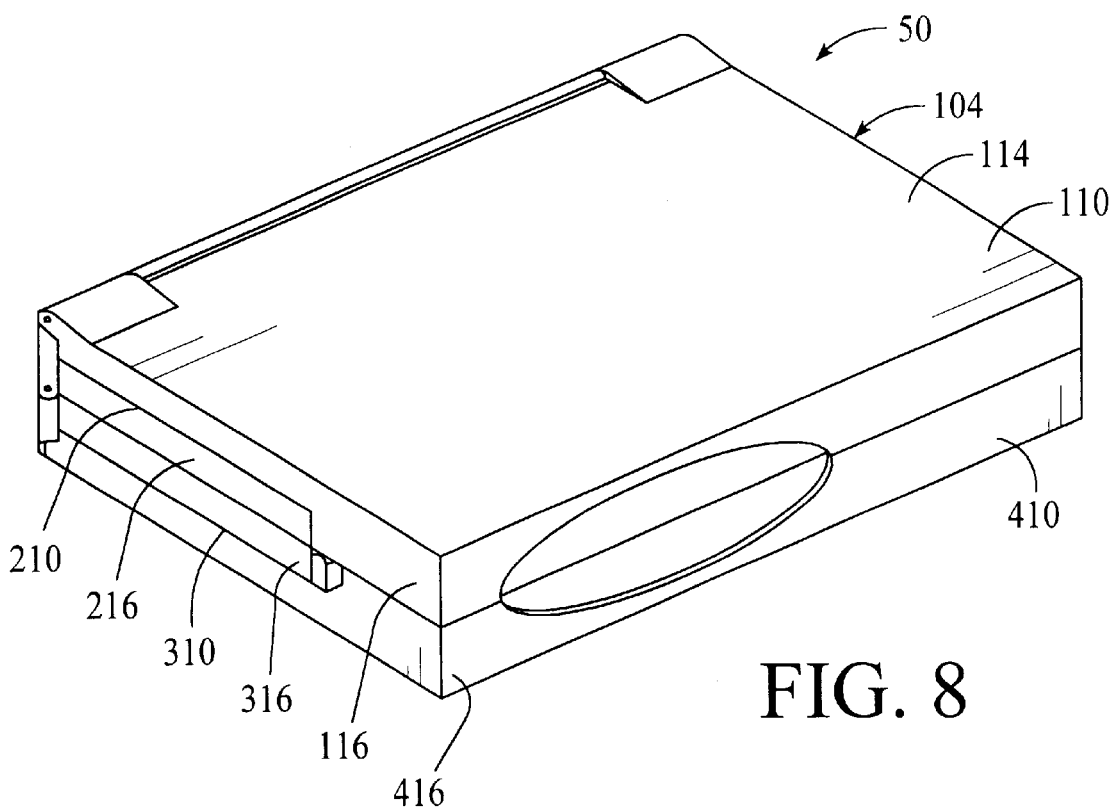
FIG. 8 is a front perspective view of the keyboard assembly of FIG. 7 in a completely folded position.

FIG. 8 shows a top front perspective view of the keyboard assembly 50 in its completely folded position 104. Keyboard assembly 50 in its completely folded position 104 presents a self contained enclosure that is comprised of portions of the frames of each keyboard section. For example, first frame 110 includes sidewall 116 extending generally perpendicularly from the bottom side 114 of first frame 110. Similarly, fourth frame 410 includes fourth sidewall 416 extending generally perpendicularly from the bottom side (not shown) of fourth frame 410. Second frame 210 and third frame 310 also include sidewalls 216 and 316. The sidewalls of each frame cooperate when keyboard assembly 50 is completely folded to provide a generally enclosed case or housing for keyboard assembly 50.

Figure 9:
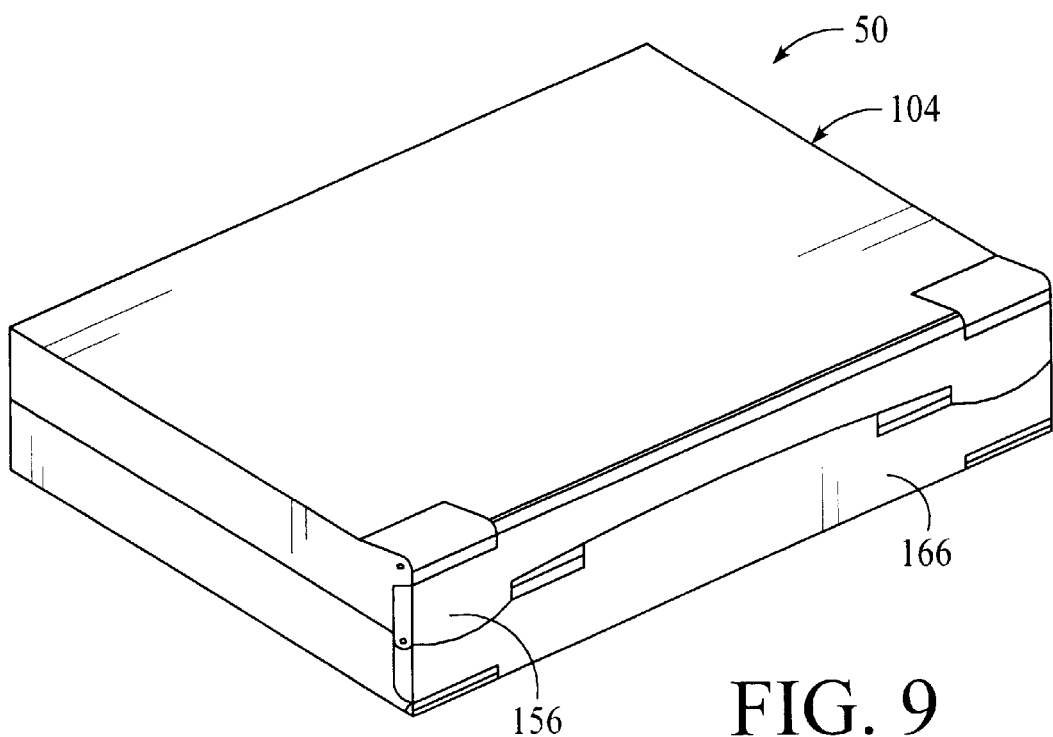
FIG. 9 is a rear perspective view of the keyboard assembly of FIG. 7 in a completely folded position.
Figure 13:
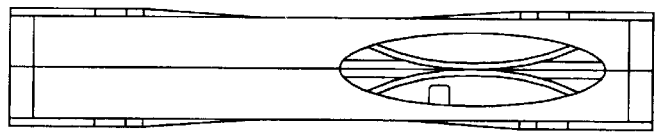
FIG. 13 is an opposite side elevational view of the keyboard assembly.
Figure 14:
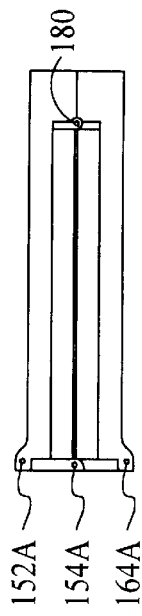
FIG. 14 is an opposite end view of the keyboard assembly.
Figure 11:
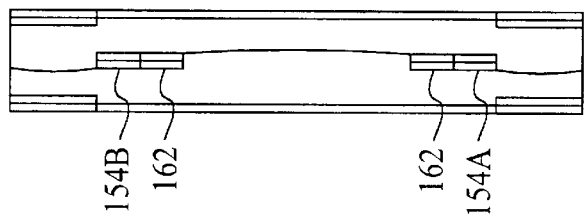
FIG. 11 is a side elevational view of the keyboard assembly.
Figure 10:
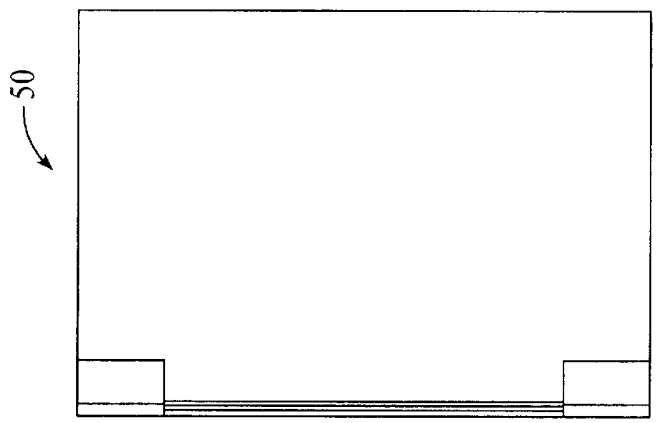
FIG. 10 is a plan view of the keyboard assembly.
Figure 12:
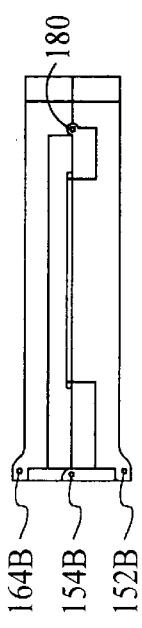
FIG. 12 is an end view of the keyboard assembly.

FIG. 9 shows a top rear perspective view of keyboard assembly 50 in its completely folded position 104. First hinge member 156 and second hinge member 166 cooperate as shown in FIG. 9 to provide another portion of a case or housing for keyboard assembly 50 in its completely folded position 104.

FIGS. 10 through 14 show top, side, and end views of keyboard assembly 50.

Figure 15A:
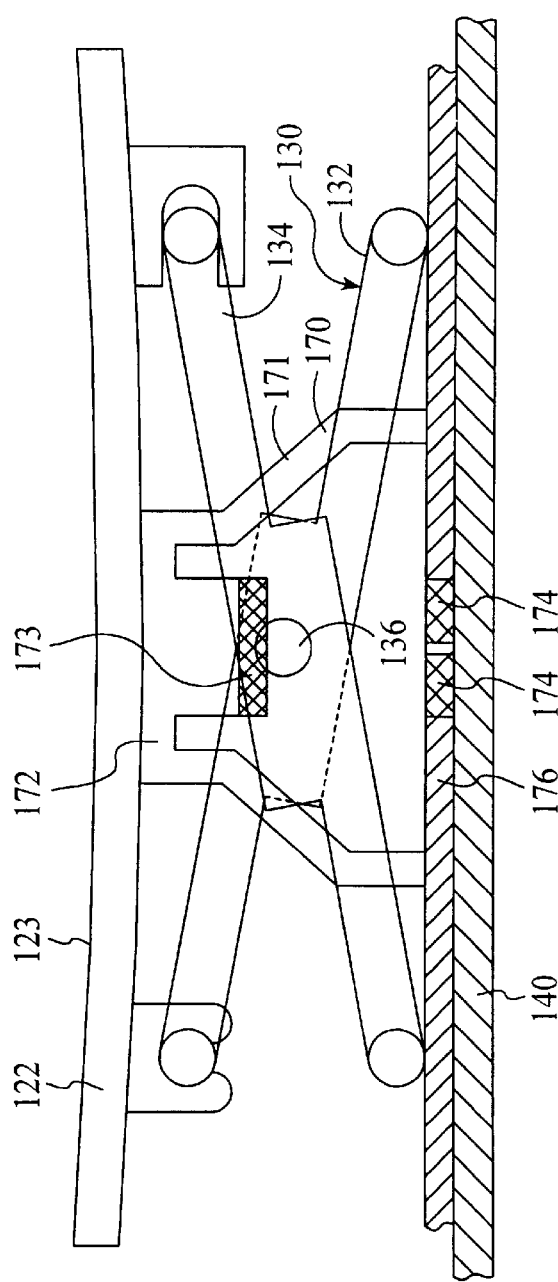
FIG. 15a is an enlarged partial sectional view of a key of the keyboard assembly.
Figure 15B:
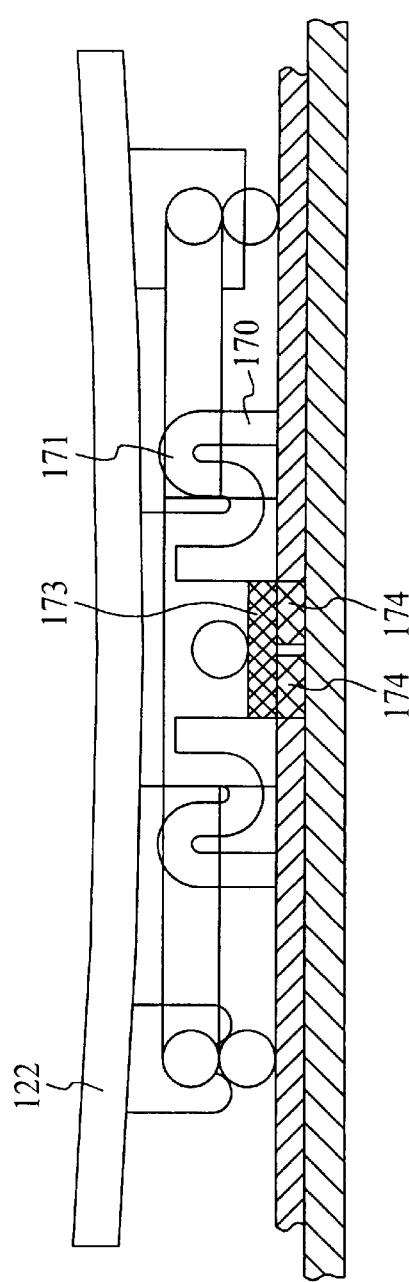
FIG. 15b is an enlarged partial sectional view of the key of FIG. 15a in a depressed position.

FIGS. 15a and 15b are enlarged partial sectional views of one of the keys of the keyboard assembly 50. FIG. 15a shows key 122 in its open or up position. FIG. 15b shows key 122 in its closed or down position. The position of key 122 in FIG. 15B can also be referred to as substantially compressed. Key 122 is preferably attached to a base 140. Referring again to FIG. 15a, key 122 has a keytop 123. Key 122 is supported by scissor link 130. Scissor link 130 includes a first arm 132 and a second arm 134. First and second arms 132 and 134 are pivotally connected at arm pivot point 136. Preferably, a pair of scissor links 130 is provided for each key 122.

Below each key 122 is a biasing member 170. In the preferred embodiment shown in FIG. 15a, biasing member 170 includes a generally frustoconical wall 171. Biasing member 170 can also be in the form of a generally hemispherical dome or any suitable shape that provides travel and tactile feel for the key. Extending downwardly from a top portion 172 of biasing member 170 is a puck 173. Puck 173 is a conductive material such as carbon. Directly below puck 173 is at least a pair of conductive leads 174. Conductive leads 174 are formed in layer 176 and are also of a conductive material such as carbon.

FIG. 15b shows key 122 fully depressed. When key 122 is fully depressed, biasing member 170 also becomes compressed such that wall 171 is collapsed and such that there may be no more travel of the key. In the substantially compressed key position shown in FIG. 15b, puck 173 contacts conductive leads 174. Key 122 need not be fully or substantially depressed, however. The contact of puck 173 with conductive leads 174 closes an electrical circuit which can then provide a signal to a signal receiver or the information device that key 122 is depressed, i.e. actuated.

The key switch design of the preferred embodiment does not utilize any elements that will be permanently affected :by long term compression. The membrane switch material is the part that is typically most susceptible to a permanent deformation. Typical designs utilize a multiple membrane layer approach. Each layer has printed on it one-half of the key switch and when made to contact each other, the switch is closed. The key switch is closed when one of the membrane layers is deflected by compression and thus made to contact another membrane layer. The switch is normally open because the two layers are normally separated in the area of the switch. The top layer, for example, can form a bubble that is resilient. The bubble can be depressed or collapsed momentarily to close the switch, and the resiliency of the membrane layer forming the bubble causes the bubble to separate from the lower layer when the force that collapsed the bubble is removed.

When compressed for long periods, the deflected layer can become permanently deformed and thus fail to perform properly. Typically, failure results when the two layers remain in contact with each other because the compressed layer loses its resiliency.

Preferably, a single membrane layer is used to avoid the permanent deformation problem. Deflection of the membrane does not occur. Both halves of the key switch are printed on the single layer membrane. Closing the switch is performed by moving a conductive element or puck 173 on the elastomeric dome 170 into contact with the key switch on the single layer membrane. The puck 173 shorts the halves of the key switch when it. The elastomeric dome, instead of the membrane, is thus compressed for the long duration while the assembly is stored in a folded position. Elastomeric material, designed properly, has been known to easily survive long durations of compression. Silicone rubber is one example of a suitable elastomeric material.

It is important that the key switch printed on the single layer membrane and the conductive element on the elastomeric dome are compatible and do not cause each other to deteriorate during long periods of contact. Conductive carbon is preferably used.

The design of the key switch pattern is not specific. For example, two half moons, quadrants, or interlacing fingers can be provided. In all cases, the switch pattern includes two halves of a switch which are shorted by a conductive element. The specific pattern does not necessarily affect the performance.

Figure 16:
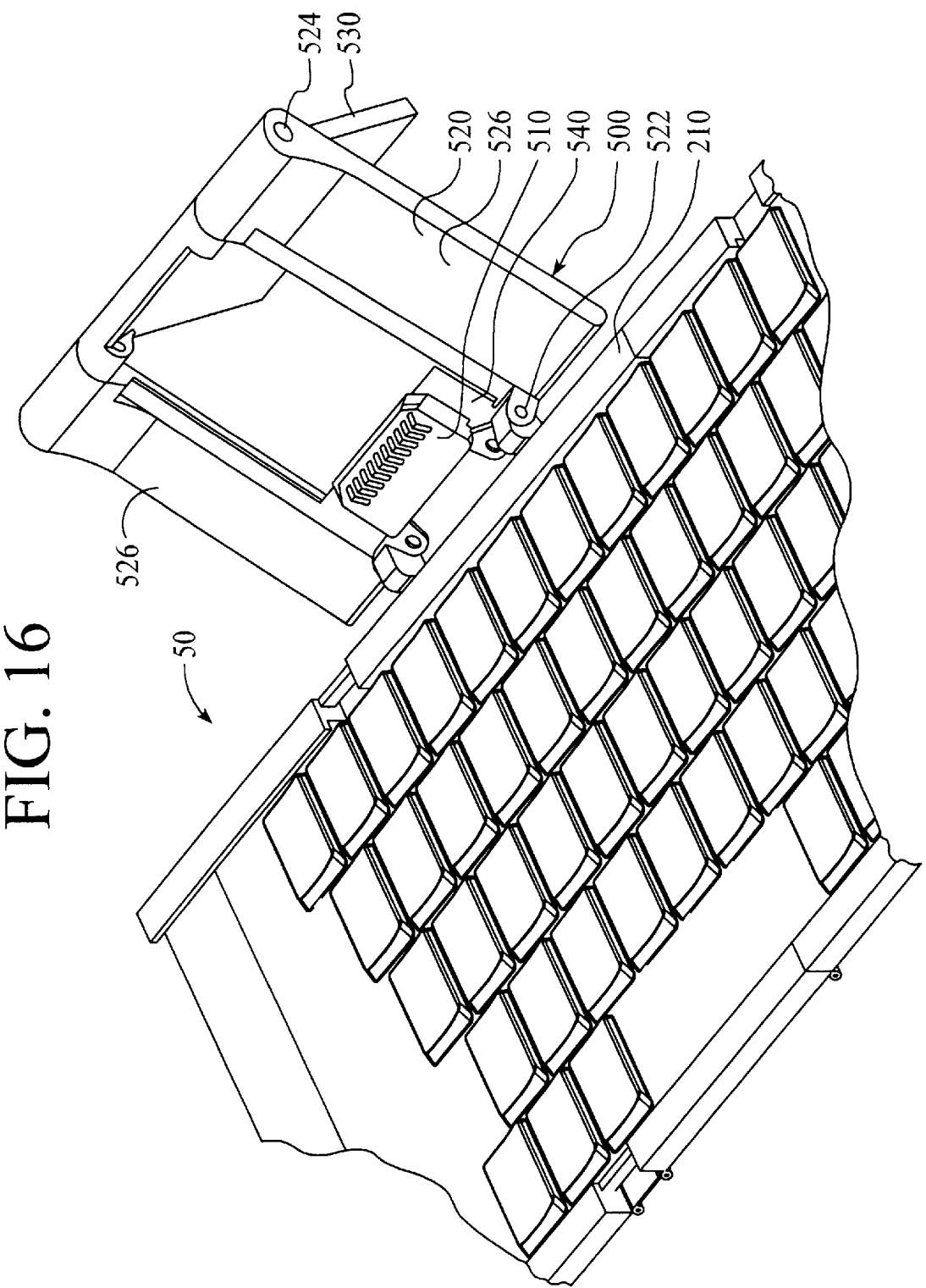
FIG. 16 is an enlarged partial perspective view of the keyboard assembly showing a connector assembly.

FIG. 16 shows keyboard assembly 50 with a connector assembly 500 extending from one of the frames of the keyboard assembly 50. Connector assembly 500 provides a docking or mounting location for an information device 60, such as the one shown in FIG. 1. Alternatively, connector assembly can be any of a number of types of connectors that provide an interface between the keyboard and an external device. For example, a cable with a connector on its end can be provided. Another example is an infrared port or a radio frequency antenna. The connector assembly 500 provides a connection location for transmission of signals or information to and from the keyboard assembly.

FIG. 16 shows connector assembly 500 includes a connector 510 (which connects mechanically and electrically to the PDA) on a base 540. The connector 510 provides for electrical connection between the keyboard and the information appliance so that electrical signals, such as key codes which identify keystrokes, can be sent from the keyboard to the information appliance. Base 540 is attached to one of the frames of the assembly 50 at inner pivot 522. Base 540 carries a telescoping frame 520. Telescoping frame 520 includes an outer pivot 524 and side members 526 extending between inner pivot 522 and outer pivot 524. A support leg 530 extends from outer pivot 524. The frame 520 may be opened when the pivot 524 is grabbed and pulled away from frame 210 in order to slide frame 520 out from frame 210. As shown in FIG. 16, when telescoping frame 520 is extended from the second frame 210, base 540 and telescoping frame 520 can be pivoted upwardly, support leg 530 can be pivoted rearwardly to provide a triangular support, structure for the information device that can then be mounted to connector assembly 500 and rested on frame 520.

FIG. 17 shows keyboard assembly 50 in a partially folded state. First hinge 150 is between first frame 110 and second frame 210. Center hinge 180 (which includes at least one axle) is between second frame 210 and third frame 310. Second hinge 160 is between third frame 310 and fourth frame 410. First hinge 150 and second hinge 160 are both double hinges. First hinge 150 includes first axles 152a and 152b and second axles 154a and 154b with hinge member 156 between the first axles 152a and 152b and the second axles 154a and 154b. Second hinge 160 is also a double axle hinge having a first axle 162 and second axles 164a and 164b and a hinge member 166 between the first axle 162 and the second axles 164a and 164b. Center hinge is a single axle hinge, shown in FIG. 17 as a piano hinge. Center hinge 180 pivotally connects second frame 210 and third frame 310 such that bottom side 214 of second frame 210 and bottom side 314 of third frame 310 are pivoted to face each other when the keyboard assembly 50 is completely folded. FIG. 7 also shows various details concerning the hinges and axles described relative to FIG. 17.

First and second hinges 150 and 160 are of the double hinge type so that the adjacent keyboard sections to which they are pivotally attached can be folded with their respective key sets toward each other. The pivoting axes of first and second hinges 150 and 160 are well below the top surfaces of the keys. The width of each hinge member 156 and 166 is selected so that enough space is provided between frames 110 and 210 and frames 310 and 410, respectively, to accommodate the respective key sets on the top sides of the frames (not shown) when keyboard assembly 50 is folded. The widths of the hinge members can be selected so that the keys of each key set that is folded toward an adjacent keyboard section's key set can be either partially or substantially compressed. Compression of the keys during storage of the keyboard assembly 50 in its completely folded position provides a keyboard assembly with a minimal thickness when folded completely. This compression of the keys (to the point that electrical shorting exists) is maintained with a latch or other mechanism to keep the keyboard closed.

FIG. 17 shows connector assembly 500 mounted to the bottom side 214 of second frame 210. Connector assembly 500, however, can be located on any of the other keyboard sections.

Figure 18:
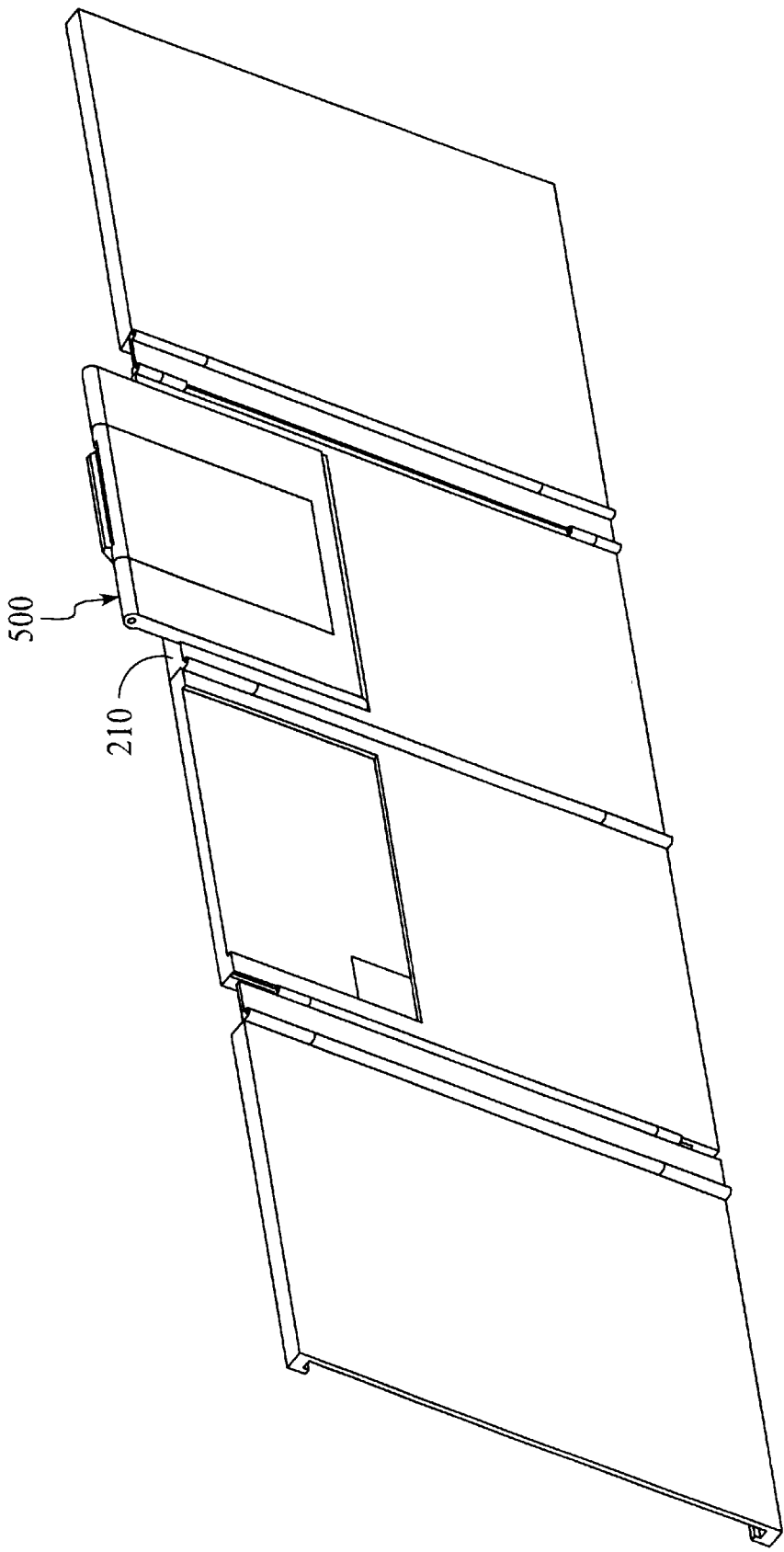
FIG. 18 is a rear perspective view of the keyboard assembly in an unfolded position.

FIG. 18 shows connector assembly 500 partially extended from frame 210.

Figure 19:
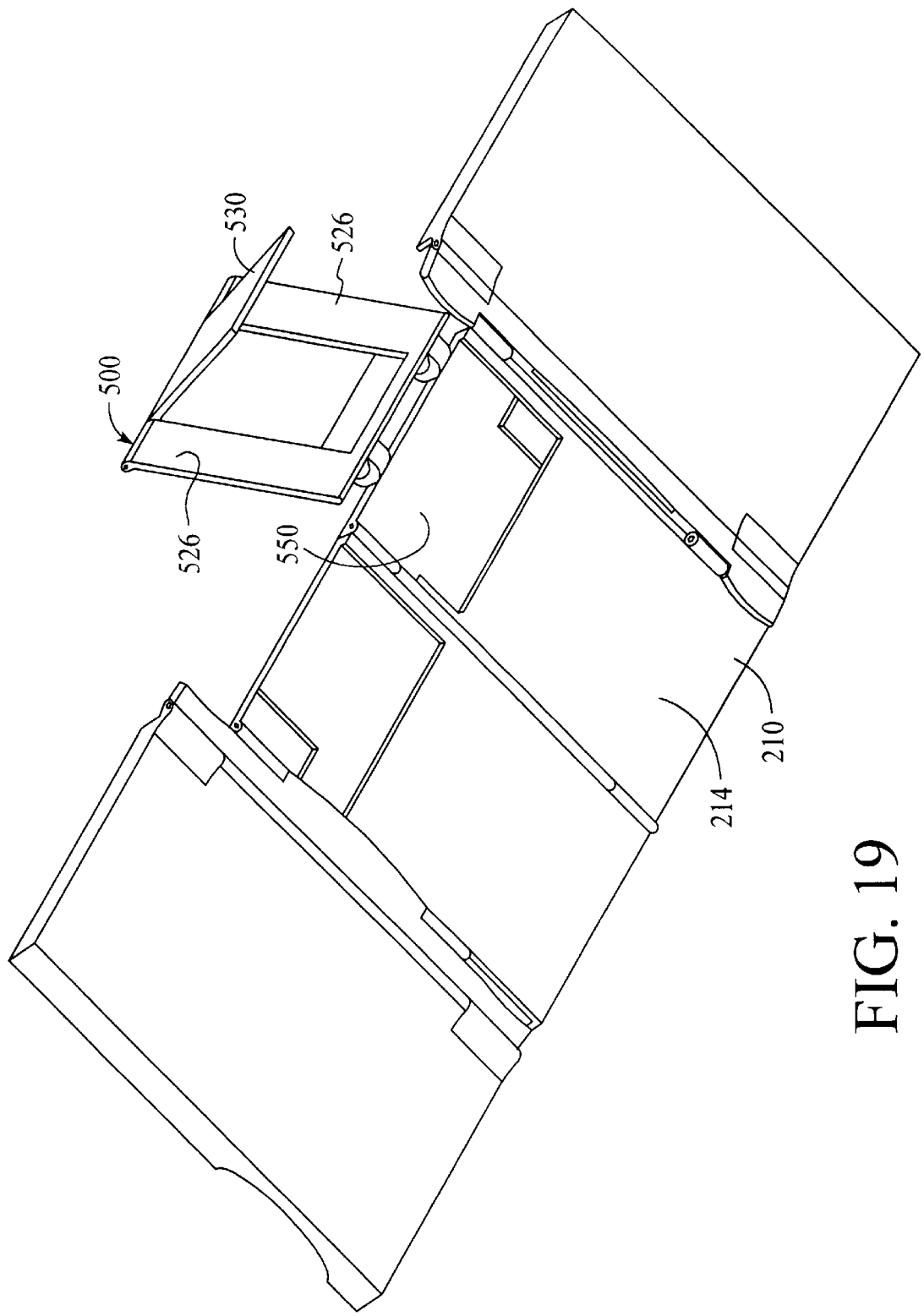
FIG. 19 is a rear perspective view of the keyboard assembly in an unfolded position and showing connector assembly extended and unfolded.

FIG. 19 shows connector assembly 500 fully extended from second frame 210. Support leg 530 is shown pivoted about outer pivot 524 outwardly from side members 526. A pocket 550 is defined on the bottom side 214 of frame 210. Pocket 550 provides a space for connector assembly 500 when connector assembly 500 is not in use and is folded away and inserted into pocket 550.

Figure 20A:
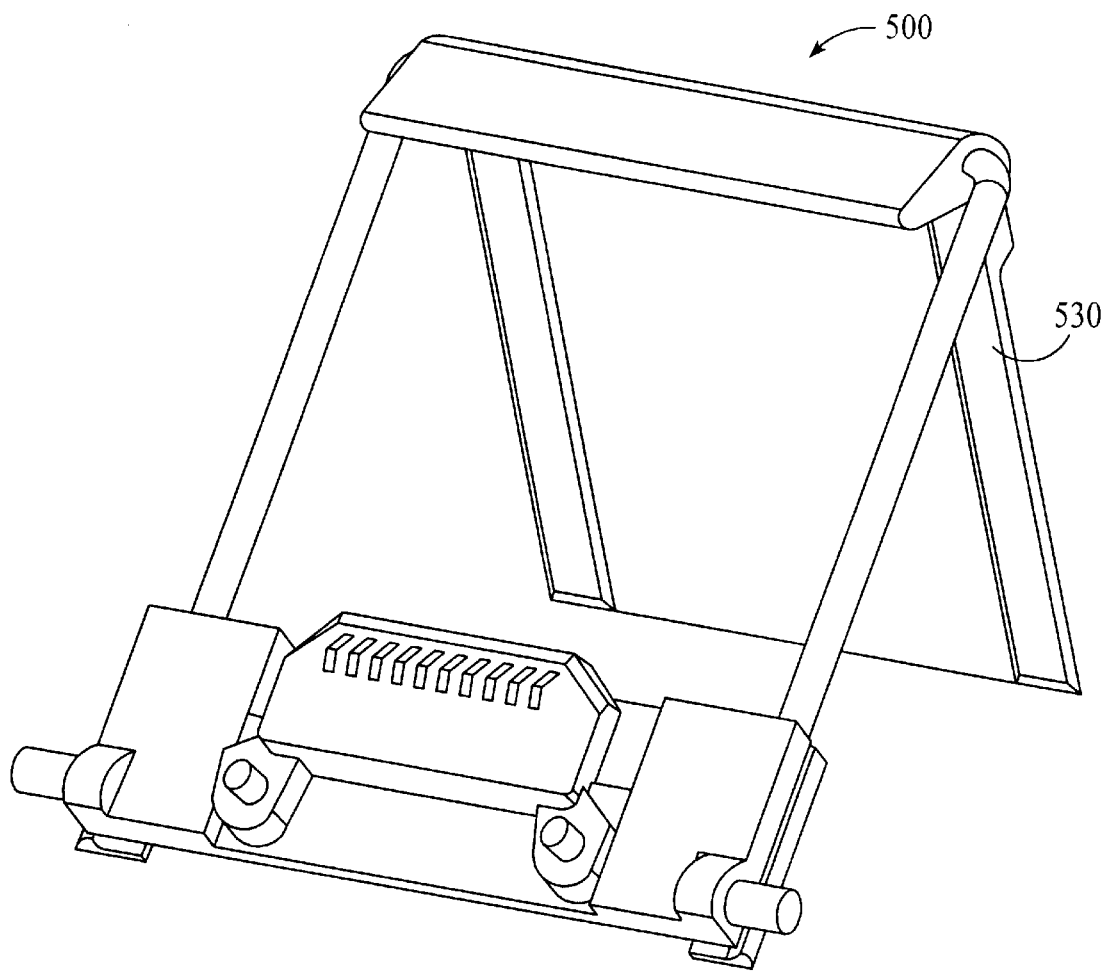
FIG. 20a is a perspective view of the connector assembly in an unfolded position.
Figure 20B:
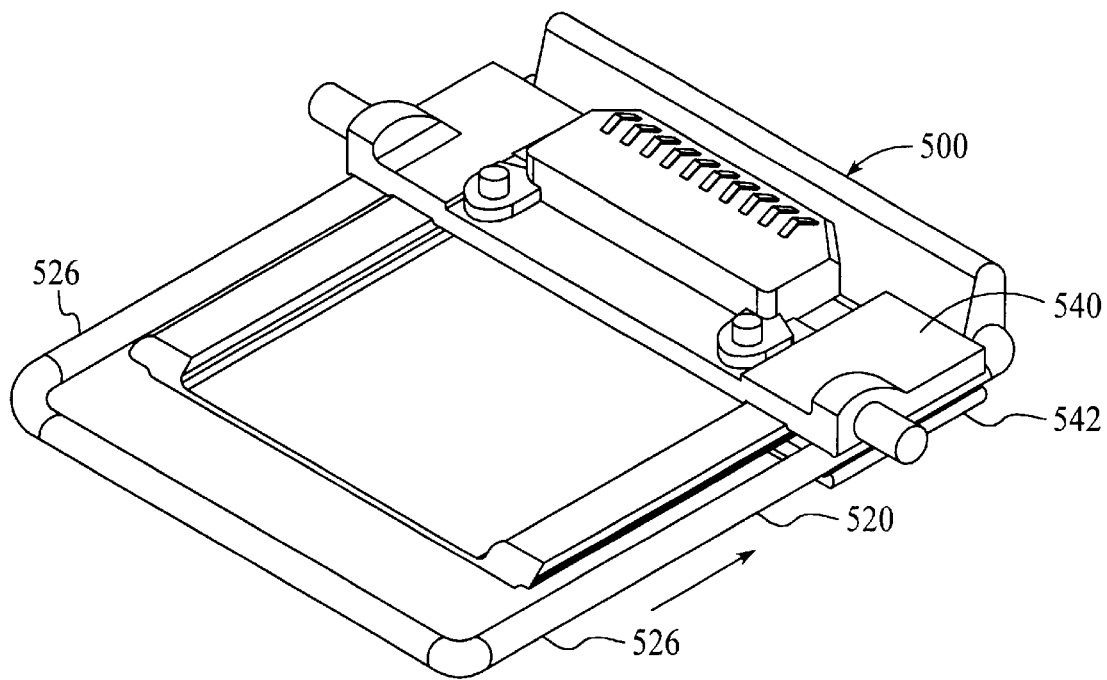
FIG. 20b is a perspective view of the connector assembly in a folded position.
Figure 20C:
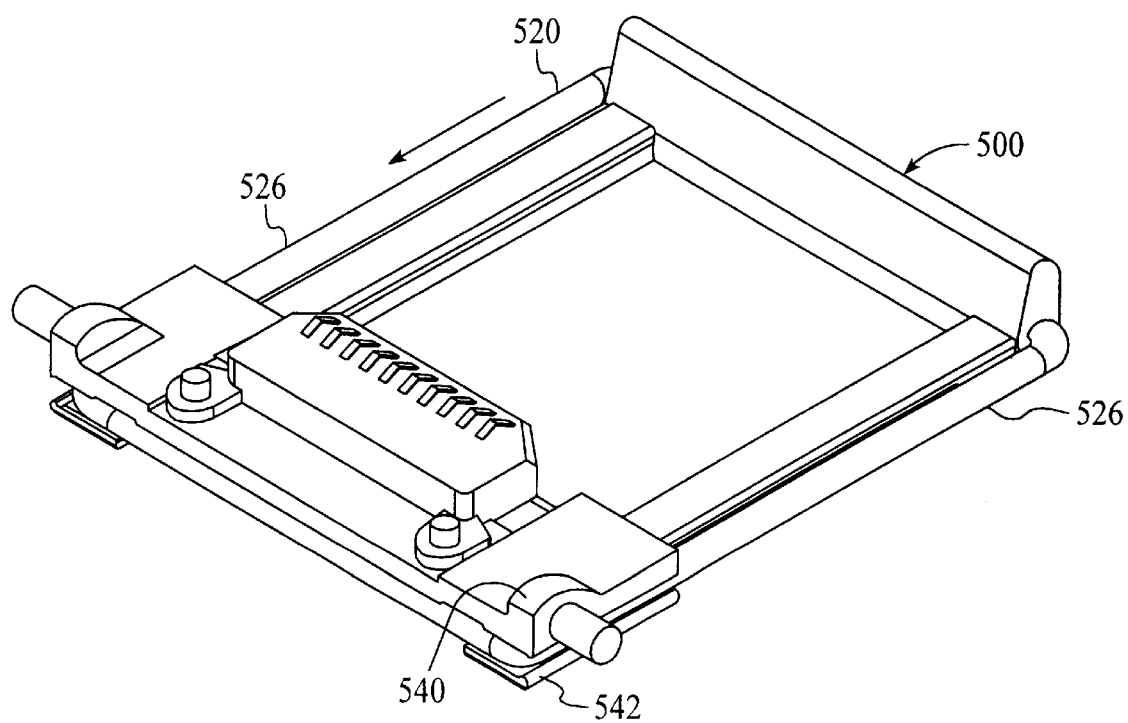
FIG. 20c is a perspective view of the connector assembly in a partially unfolded position.

FIGS. 20a through 20c show connector assembly 500 in various positions. FIG. 20a shows connector assembly 500 in an extended position with support leg 530 rotated outwardly. FIG. 20b shows connector assembly 500 in its fully stored position. Telescoping frame 520 is slidable in the direction of the arrow in FIG. 20b. In particular, side members 526 slide through grooves 542 in base 540. FIG. 20c shows the connector assembly 500 in its fully extended position. From this position, telescoping frame 520 can be pushed in the direction of the arrow shown in FIG. 20c. Side members 526 are slidable through grooves 542 in base 540.

Figure 21:
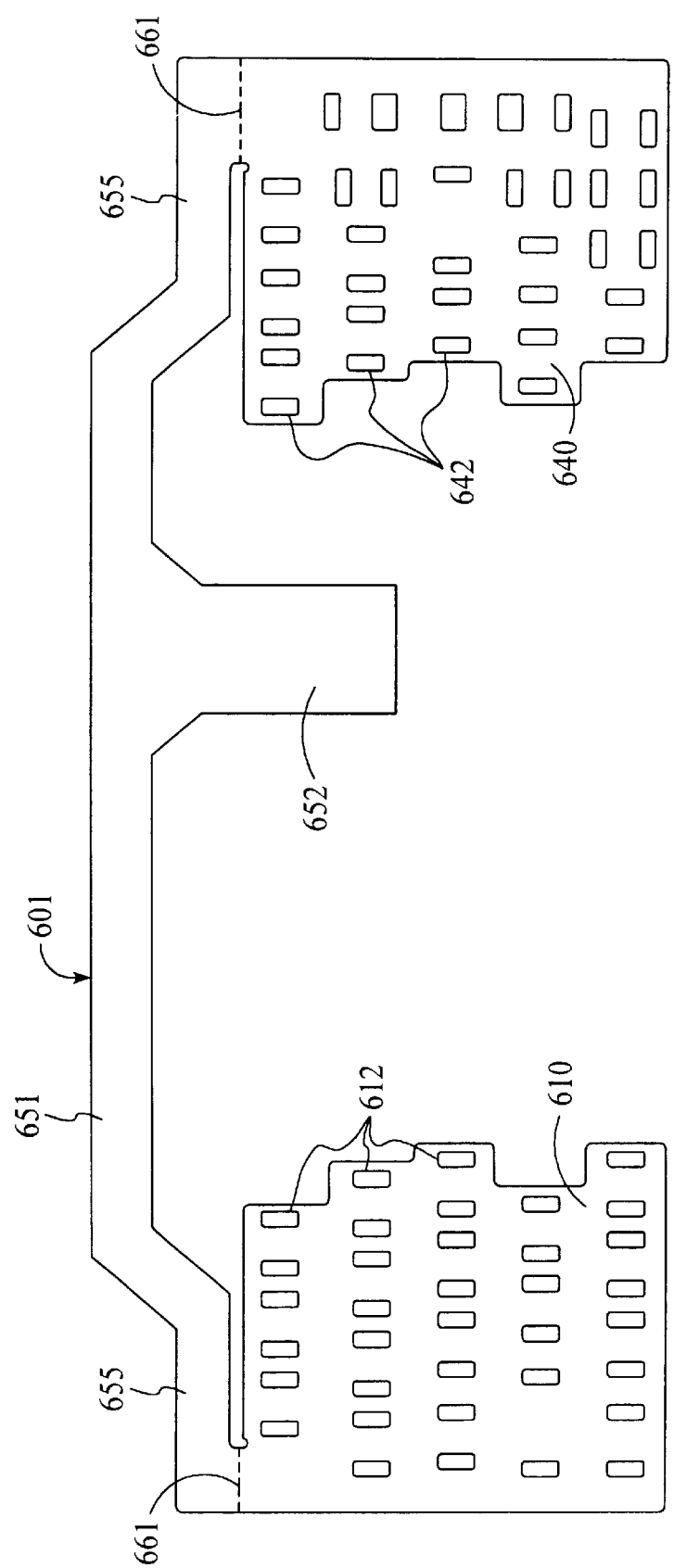
FIG. 21 is a plan view of a flexible circuit of the keyboard assembly.

FIG. 21 shows an example of an outer flex circuit 600. The outer flex circuit 600 provides the contact point 612 for the pluralities of first and fourth keys. Outer flex circuit 601 includes a first panel 610 and a fourth panel 640. First panel 610 corresponds and is used with first key set 120, and fourth panel 640 corresponds and is used with fourth key set 420. First panel 610 is connected to fourth panel 640 by outer flexible bridge 651. Outer flex circuit 601 including the panel and the bridge is preferably a flexible printed circuit membrane. An outer extension 652 extends generally perpendicularly from outer flexible bridge 651. Outer extension 652 can provide a connection point for an external device such as an information appliance (e.g. a Palm PDA).

First panel 610 includes a plurality of first contact points 612. First contact points 612 each correspond to one of the plurality of first keys 122 of first key set 120. Fourth panel 640 includes a plurality of fourth contact points 642. Each of the plurality of fourth contact points 642 corresponds to one of the plurality of fourth keys 422 of fourth key set 420.

The outer flexible bridge 651 is folded along fold lines 661. Also, outer flexible bridge 651 includes loop sections 655 near the ends of outer flexible bridge 651. Outer flexible bridge 651 is connected to panels 610 and 640 at the ends of loop sections 655. Fold lines 661 are located at the junction between loop sections 655 at each end of outer flexible bridge 651 and each of the first panel 610 and fourth panel 640.

Figure 22:
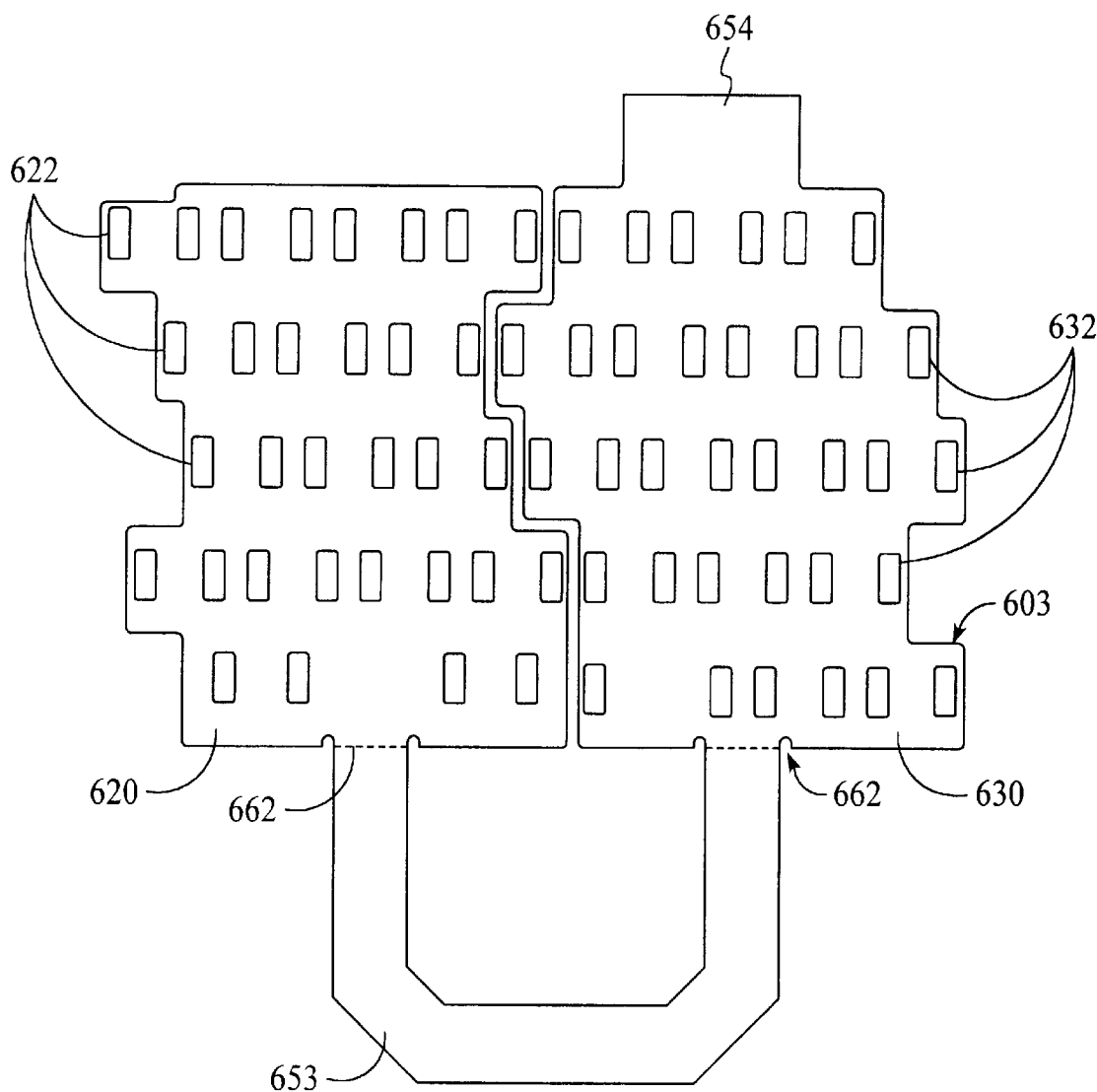
FIG. 22 is a plan view of a flexible circuit of the keyboard assembly.

FIG. 22 shows an example of an inner flexible circuit 603 having a second panel 620 and a third panel 630. An inner flexible bridge 653 connects second panel 620 and third panel 630. Second panel 620 includes a plurality of second contact points 622, which corresponds to and is used with one of the plurality of second keys 622. Third panel 630 includes a plurality of third contact points 632, each of which corresponds to and is used with one of the plurality of third keys 322. Inner flexible circuit 603 also includes an inner extension 654 which provides an area on which a connector can be attached for mounting to a printed circuit board or an external device.

Inner flexible bridge 653 is joined to panels 620 and 630. Fold lines 662 are located where inner flexible bridge meets each panel.

Figure 23:
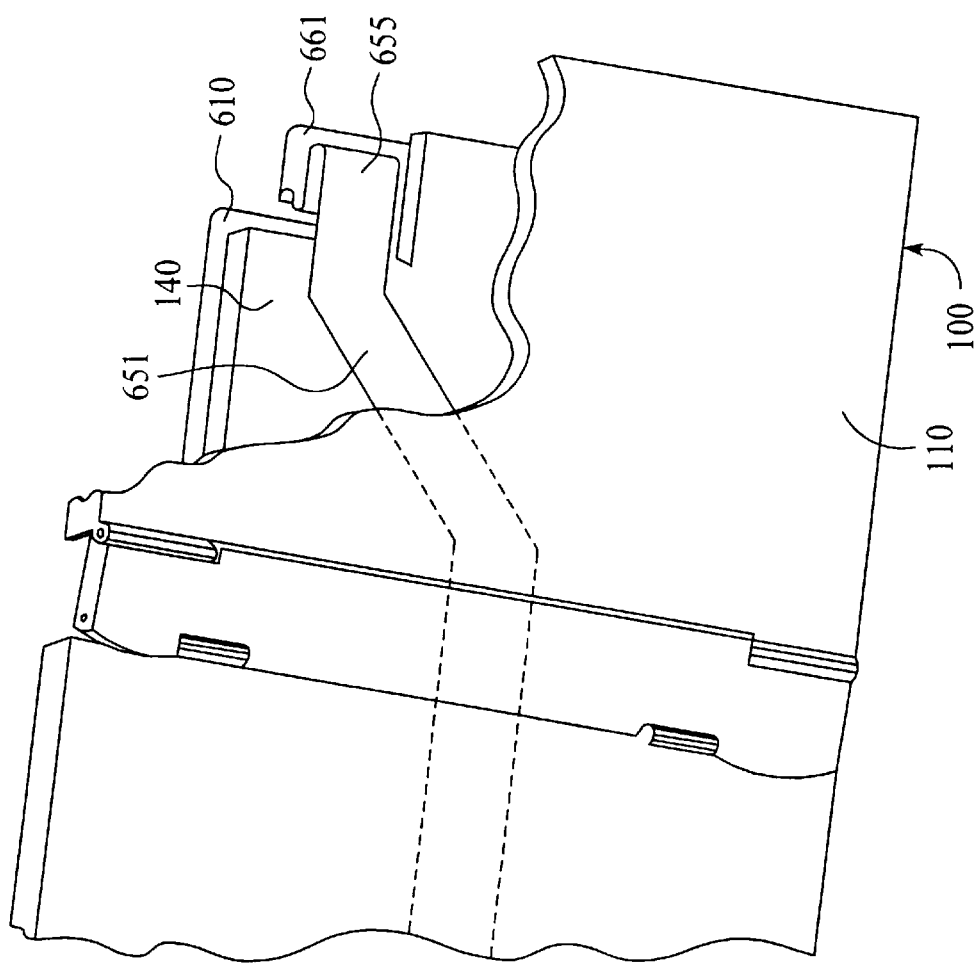
FIG. 23 is a partial broken perspective view of the keyboard assembly showing the flexible circuit in a folded position.

FIG. 23 shows a portion of outer flexible circuit 601 assembled with first keyboard section 100. Outer flexible bridge 651 is shown folded at fold line 661. Also section 655 is shown folded in a double fold that forms a loop which provides enough slack so that first base 140 can be moved laterally with respect to first frame 110. Not shown in FIG. 23 is first key set 120 which is positioned above first panel 610 on base 140.

Figure 24:
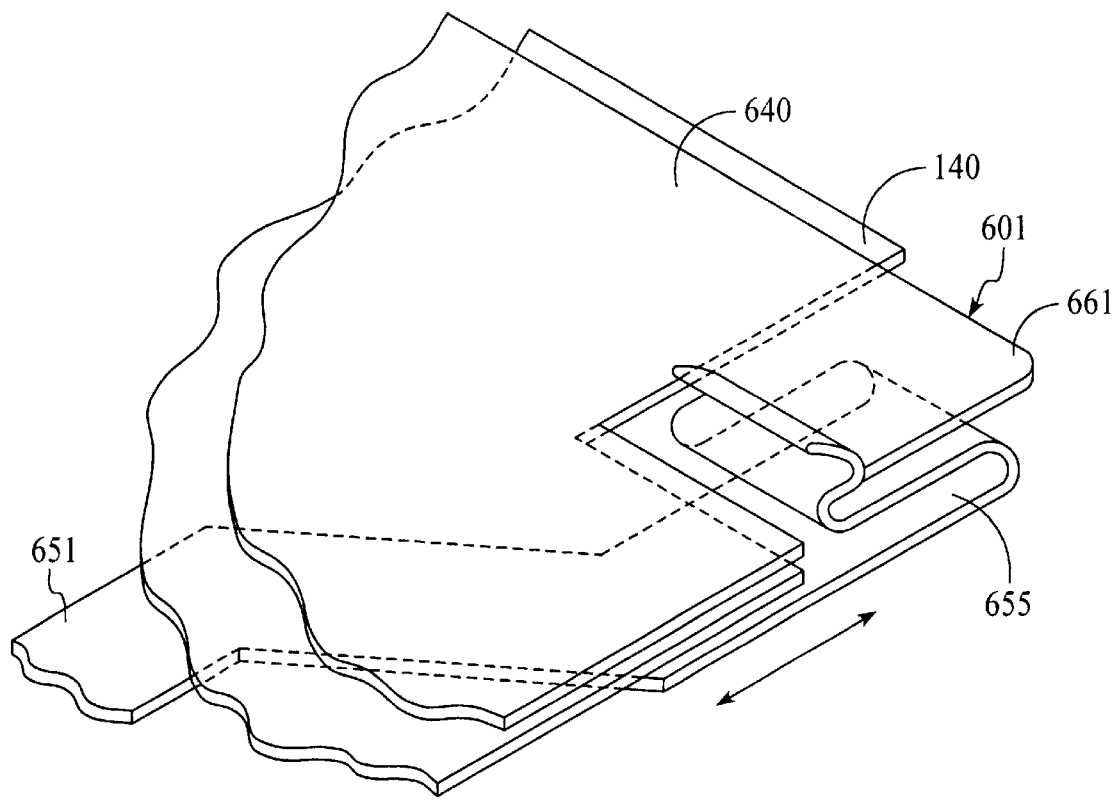
FIG. 24 is a partial perspective view of the flexible circuit of the keyboard assembly.
Figure 26:
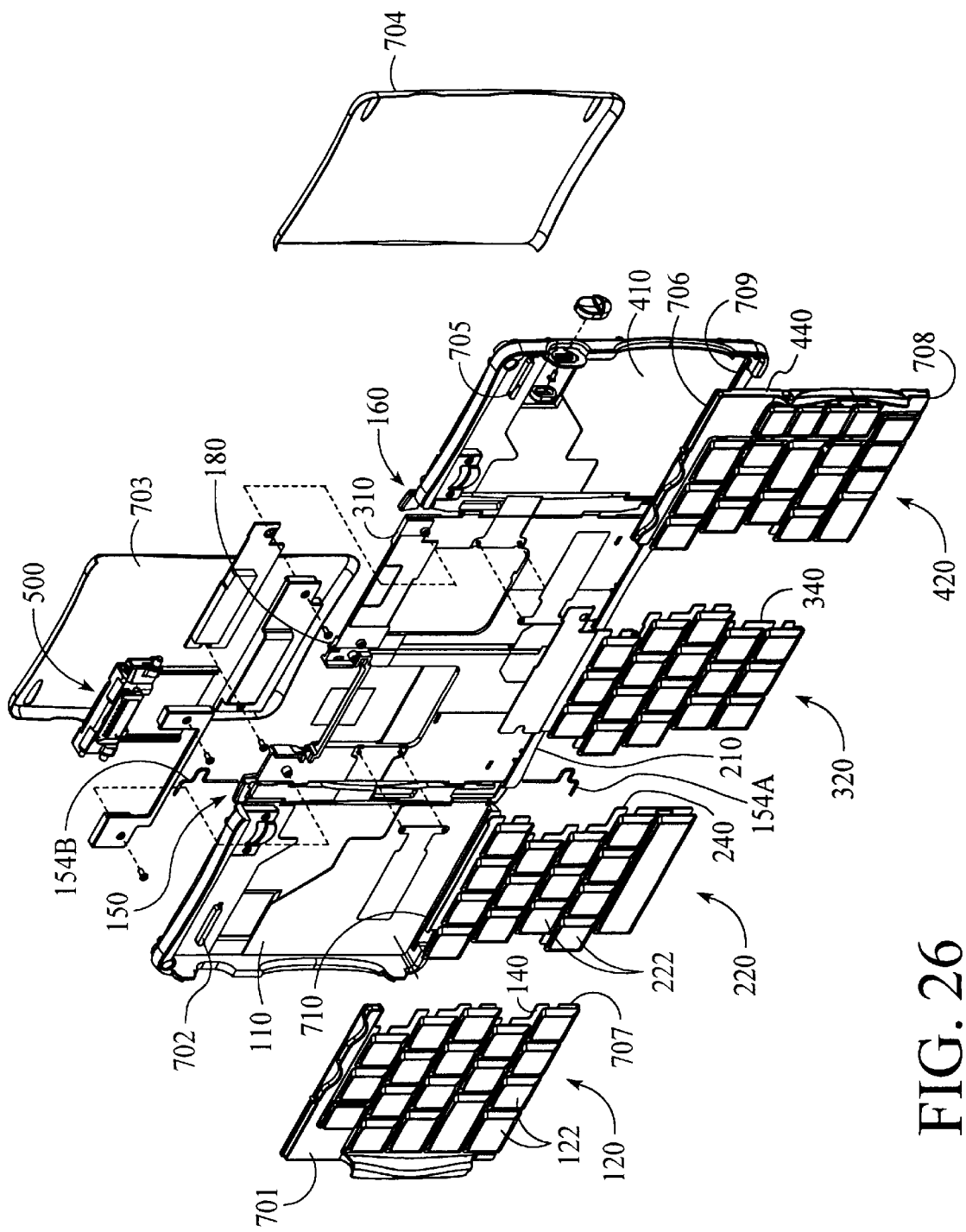
FIG. 26 shows an exploded view of one embodiment of a collapsible keyboard according to the present invention.

FIG. 24 shows a portion of first panel 640 of outer flexible circuit 601. First panel 640 is shown positioned on top of base 140. Outer flexible bridge 651 is shown folded at fold line 661 such that outer flexible bridge 651 is positioned under base 140. The double arrow of FIG. 26 shows the direction of lateral movement of base 140 relative to first frame 110 (not shown). Loop section 655 is shown to illustrate that loop section 655 provides slack in outer flexible bridge 651 to accommodate the movement of base 140 in the direction of the arrows.

Figure 25:
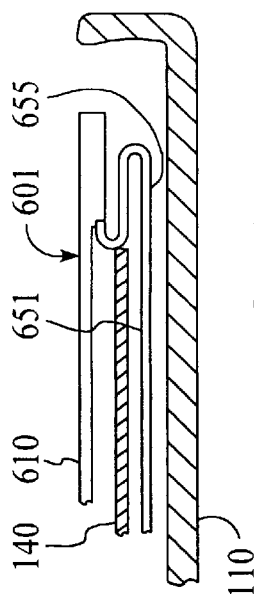
FIG. 25 is an enlarged partial sectional view of the keyboard assembly showing the flexible circuit.

FIG. 25 is an end view of a portion of frame 110 including base 140 and outer flexible circuit 601. Loop section 655 is shown folded such that outer flexible bridge 651 is positioned under base 140 while first panel 610 of outer flexible circuit 601 is positioned above base 140.

FIG. 26 shows an exploded view of a four section keyboard according to one embodiment of the present invention. Each of the key sets 120, 220, 320, and 420 is each disposed on its respective base 140, 246, 340, and 440 as shown in FIG. 26. Each respective base is supported by and resides within its corresponding frame. For example, the base 140 is slidingly held by the first frame 110. Similarly, the fourth base 440 is slidably held by the fourth frame 410. Frame 110 includes a ridge 702 and a slot or ridge 710 which respectively receive a ridge 701 and a ridge 707 on the base 140. Ridge 701 slides within the ridge 702, and ridge 707 slides within the ridge 710, thereby securing the base 140 slidably within the frame 110. Similarly, the ridge 706 slides within the ridge 705 on the frame 410 while: the ridge 708 on base 440 slides within the ridge 709 in order to slidably secure base 440 with its fourth key set 420 onto the frame 410. Key sets 220 and 320 are fixedly secured onto frames 210 and 310. As shown in FIG. 26, frames 210 and 310 are joined by the hinge 180. Frames 110 and 210 are joined by double hinge 150, and frames 310 and 410 are joined by the double hinge 160. Backplates 703 and 704 cover the back side of frames 110 and 410 in order to cover the mechanical and electrical components associated with bases 140 and 440.

Figure 28A:
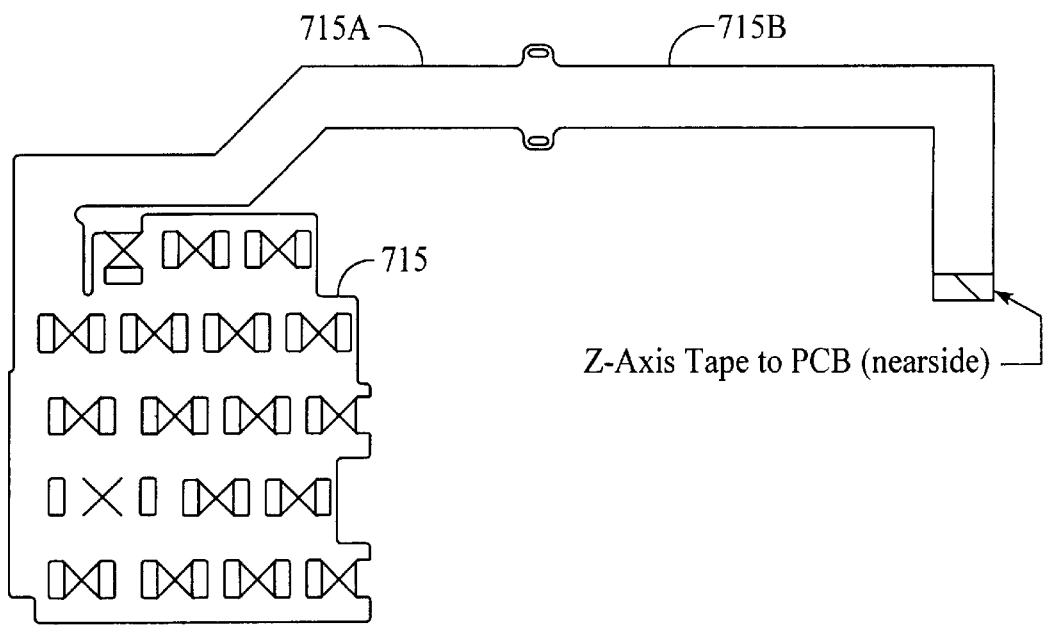
FIGS. 28a and 28b show an example of a flexible printed circuit for use with a left outer section of a four section keyboard according to one embodiment of the invention.
Figure 28B:
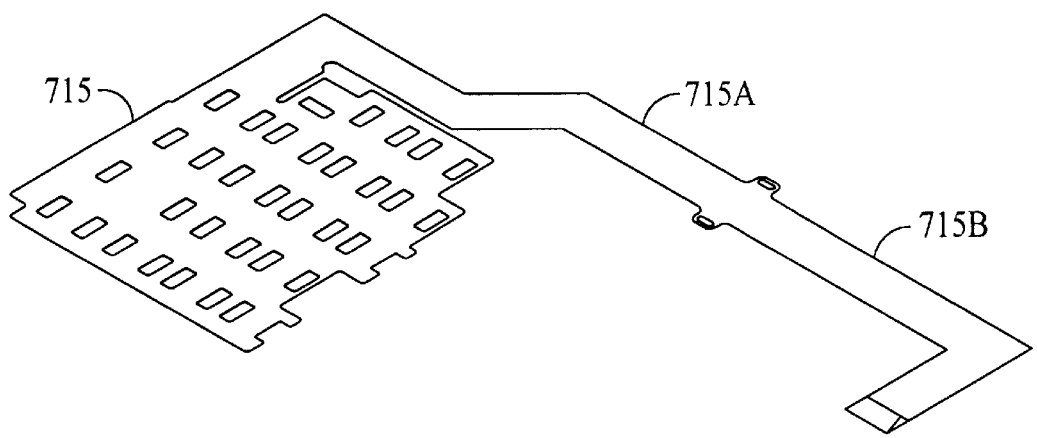

FIGS. 28a, 28b, 29a, 29b, 30a, 30b, 31a, 31b, and 31c will now be referred to while describing one embodiment of a four section keyboard which is collapsible and which uses flexible printed circuit membranes and tapes to interconnect the various sections of the keyboard. FIGS. 28a and 28b show two views of the flexible printed circuit membrane and tape used for the left outer section of the keyboard. The main printed circuit section 715 is disposed under the first set of keys on the left outer section of the keyboard. Typically, this printed circuit section 715 is disposed between the base 140 and the first set of keys 120. This printed circuit may be a conventional keyboard matrix array which includes conductors which may be shorted (e.g. layer 176 shown in FIG. 15a) and which has been separated into an appropriate section for those keys disposed in the first key set 120. A flexible printed circuit (e.g. a tape with conductive traces located on the tape which is flexible) extends from the printed circuit section 715 to form tape regions 715a and 715b and these tapes 715a and 715b serve to conduct electrical signals (e.g. key codes) to and from the information appliance.

Figure 29B:
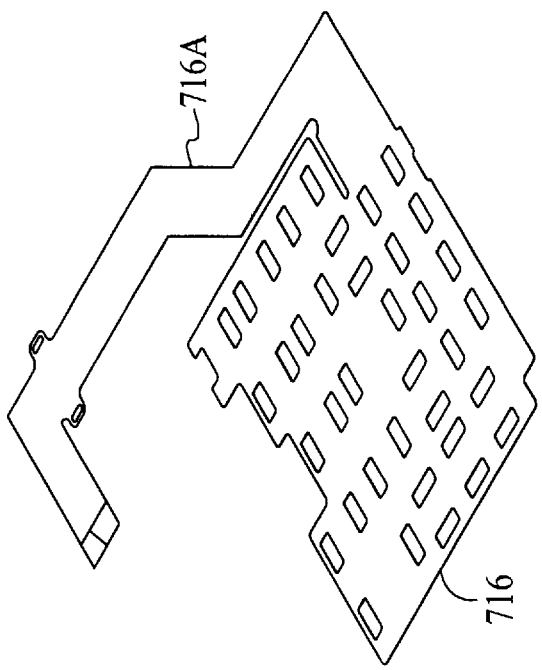
FIGS. 29a and 29b show an example of a flexible printed circuit for use with a right outer section of a four section keyboard.
Figure 29A:
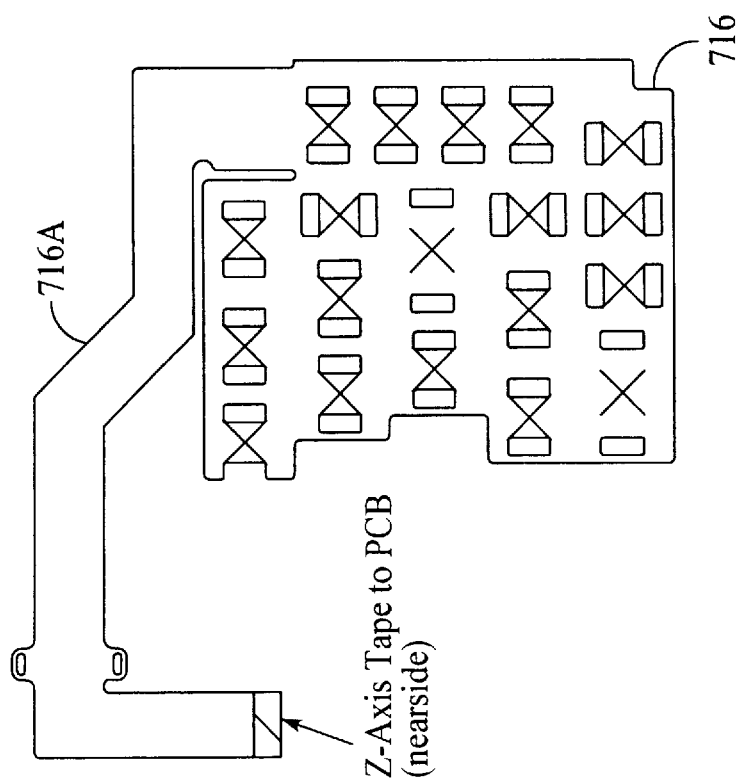

FIGS. 29a and 29b show two views of a flexible printed circuit for the right outer keyboard section which includes the fourth key sets 420 which are disposed on a corresponding base 440. The main printed circuit section 716 is typically disposed between the fourth key set 420 and the fourth base 440 and is also a conventional keyboard matrix circuit which has been sectioned into the appropriate electrical matrix section for the fourth set of keys. The printed circuit 716 is coupled to a flexible printed circuit tape 716a which extends away from the printed circuit section 716.

FIGS. 30a and 30b show two views of the printed circuit sections 717 for the two interior sections of the four section keyboard. Printed circuit layer 717a is typically disposed between the second key set 220 and the second base 240, and the printed circuit layer 717b is disposed between the third key set 320 and the third base 340. Printed circuit layers 717a and 717b are also sections of the conventional keyboard matrix appropriately sectioned for the corresponding keys in the key sets of the section. Each of these printed circuit layers includes a flexible printed circuit tape 717c which is designed to convey the signals from the keyboard matrix to a keyboard controller.

Figure 31A:
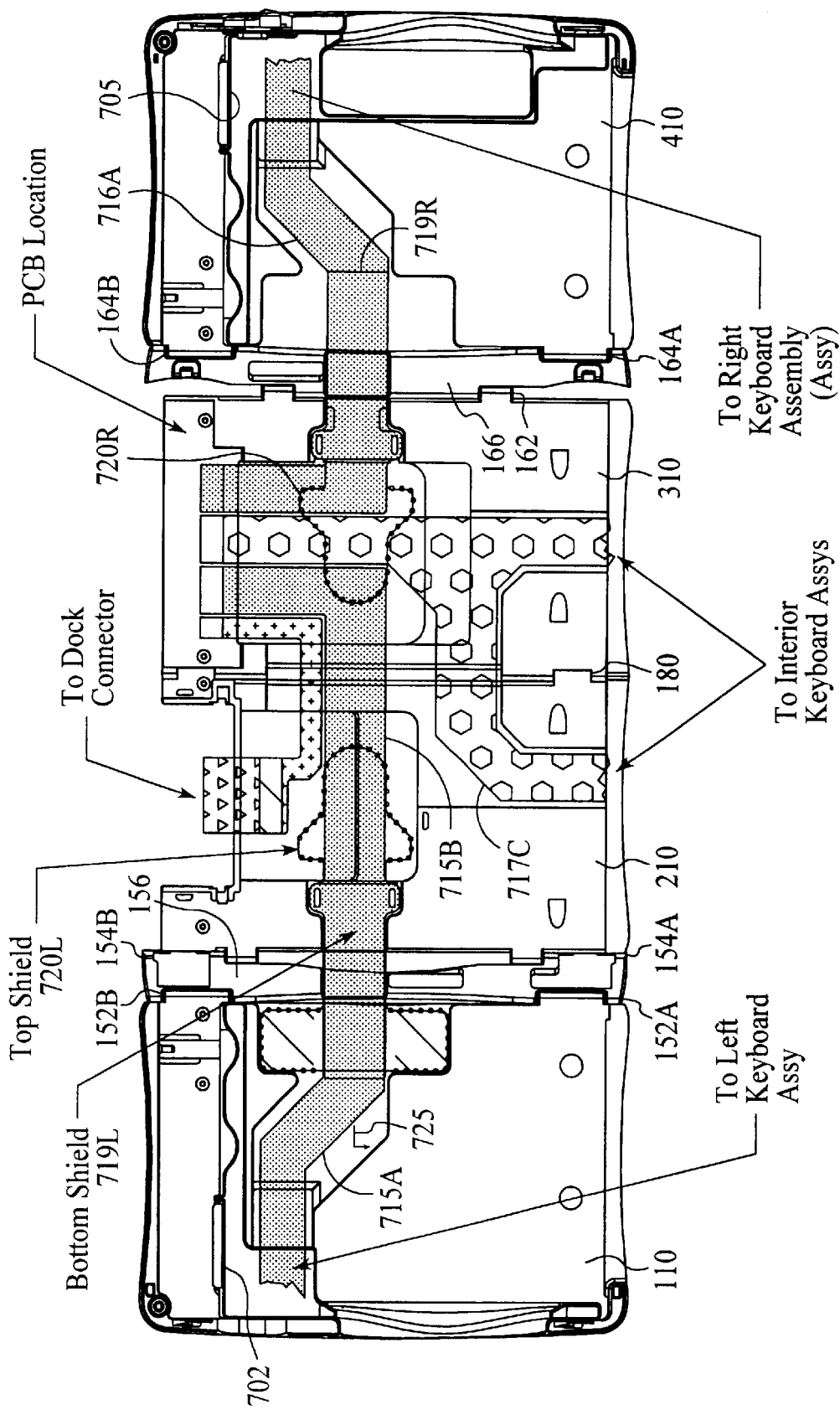
FIG. 31a shows a top view of a four section keyboard according to one embodiment; in this view, the four different sets of keys and their corresponding faces have been removed in the top view shown in FIG. 31a in order to show portions of the flexible printed circuit and the corresponding dressings of these flexible printed circuits around the hinges of the four section keyboard.
Figure 31B:
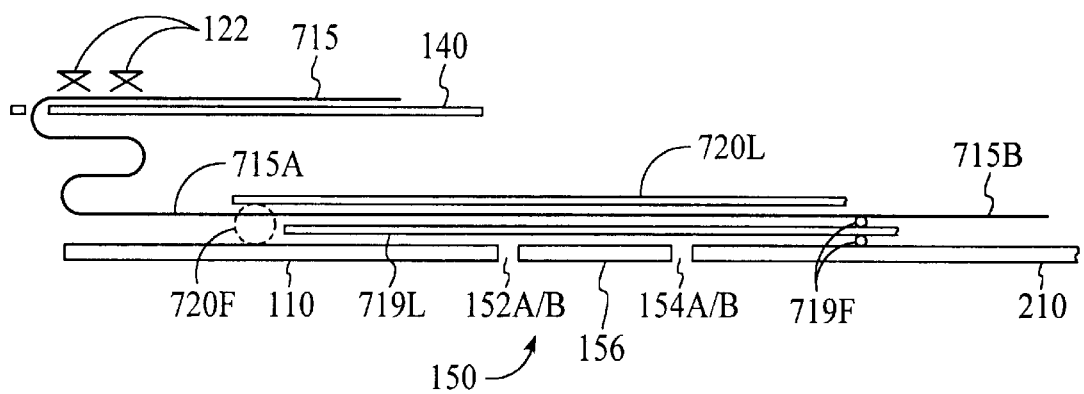
FIG. 31b shows a side/cross-sectional view taken along line 725 of FIG. 31a; this side/cross-sectional view shows further details concerning the manner of dressing the flexible printed circuit in the area of a double hinge.
Figure 31C:
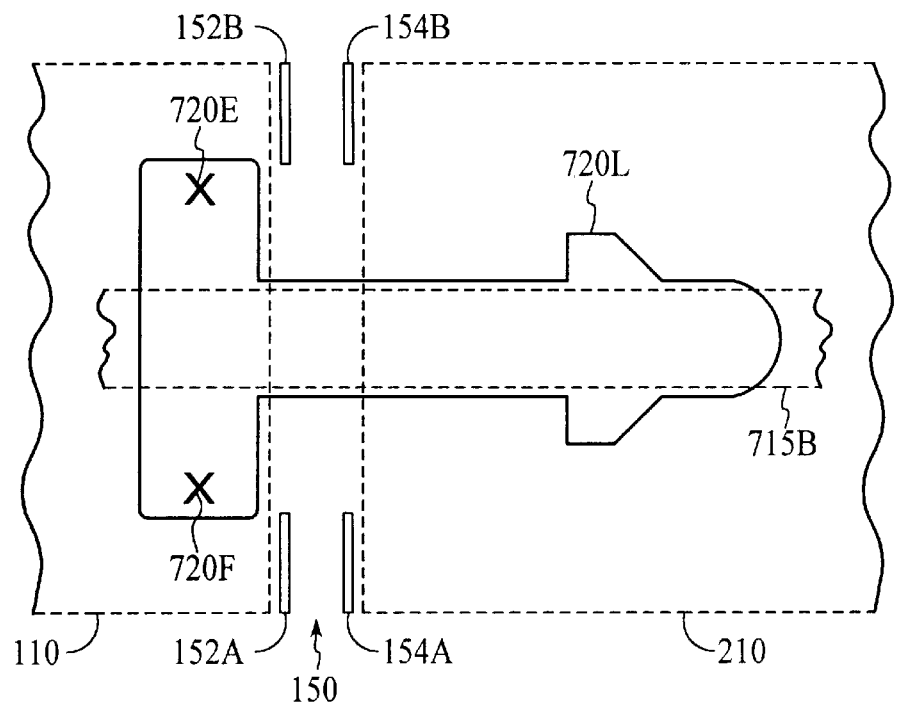
FIGS. 31c and 31d show further details concerning the dressing of the flexible printed circuit around the area of a: double hinge according to one embodiment of the present invention.
Figure 31D:
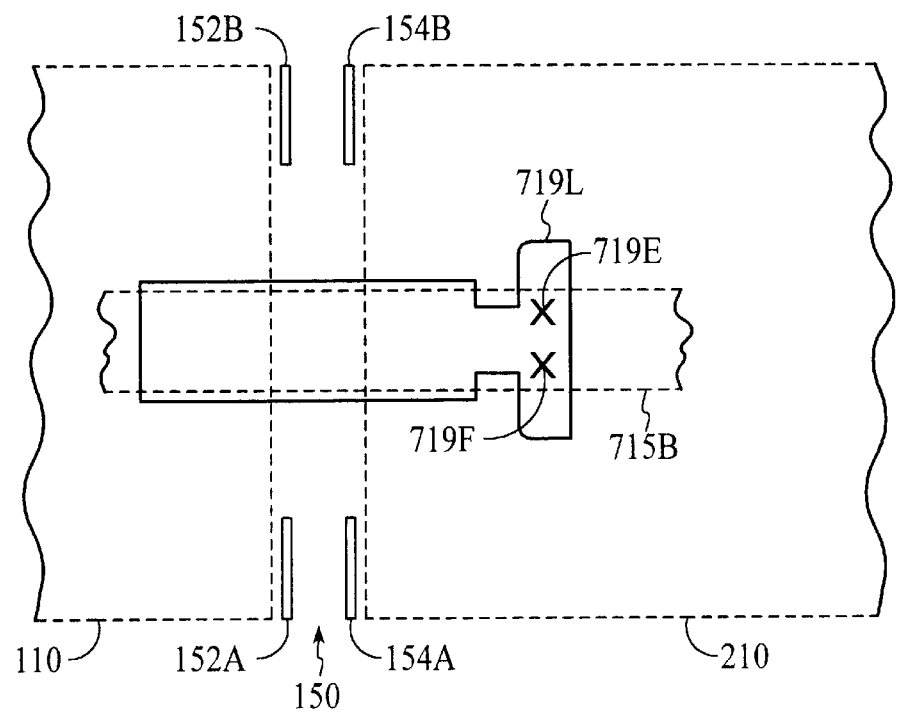

FIG. 31a shows a top, open view of the four frames 110, 210, 310, and 410 which include portions of the tapes from the printed circuit layers shown in FIGS. 28a, 29a, and 30a. FIG. 31a also includes various axle and hinge details which correspond to the details shown in FIGS. 7 and 17 as well as other figures herein. Dressing for the printed circuit tapes 715a and 716a is provided in order to allow these printed circuit tapes to be used reliably in the two outer sections which move relative to the two interior sections. Details concerning this dressing is further shown in FIGS. 31b, 31c, and 31d. FIG. 31b is a side or cross-sectional view taken along line 725 and shows the arrangement of the top shield or guard relative to the bottom shield or guard and relative to the other components between the left outer section which includes the frame 110 and the interior section which includes the frame 210. FIG. 31c is a top view of the top shield 720L without showing in this view the bottom shield or certain details of the hinge 150.

As shown in FIG. 31b, the top shield 720L covers the printed circuit tape 715b over the region of the double hinge which includes the hinge member 156 and the axles 152a and 152b as well as axles 154a and 154b. The printed circuit tape 715b is above the bottom shield or guard 719L, and this shield or guard 719L is above the double hinge area 150 as well as the frames 110 and 210 as shown in FIG. 31b. The bottom shield 719L is fixed (e.g. by glue) to the inner face of the frame 210 as shown in FIG. 31b, and this shield is also fixed to the printed circuit tape 715b at the points 719f. This fixedly secures the printed circuit tape 715b at this portion of the frame 210 to the bottom guard 719L. The fixation of the tape 715b to the bottom guard 719L and to the frame 210 is also shown in the top view of FIG. 31d, where the points of fixation are shown by the points 719f and 719e. The top shield 719L is not fixed to the tape 715b and thus allows the tape 715b to move relative to the top shield 720L. The top shield 720L is, however, secured to the frame 110 by the fixation point 720f as shown in FIGS. 31b and 31c in which the fixation points 720e and 720f represent the points of fixation of the top shield 720L to the frame 110. This fixation may be through the use of glue or other mechanisms to adhere the top shield 720L to the frame 110. The tape 715b includes two loops (also shown in FIG. 24) which allow for movement of the printed circuit tape. As shown in FIG. 31b, the printed circuit tape winds through an opening in the base 140 and connects to the printed circuit layer 715 as shown in FIG. 31b and 28a. It will be appreciated that the outer right section of the four section keyboard includes a similar manner of dressing the tape 716a with the use of the top shield 720r and the bottom shield 719r. It will also be appreciated that tape 715b and bottom guard 719L may be secured to frame 210 by securing these items to base 240 which is secured to the frame 210.

Figure 32:
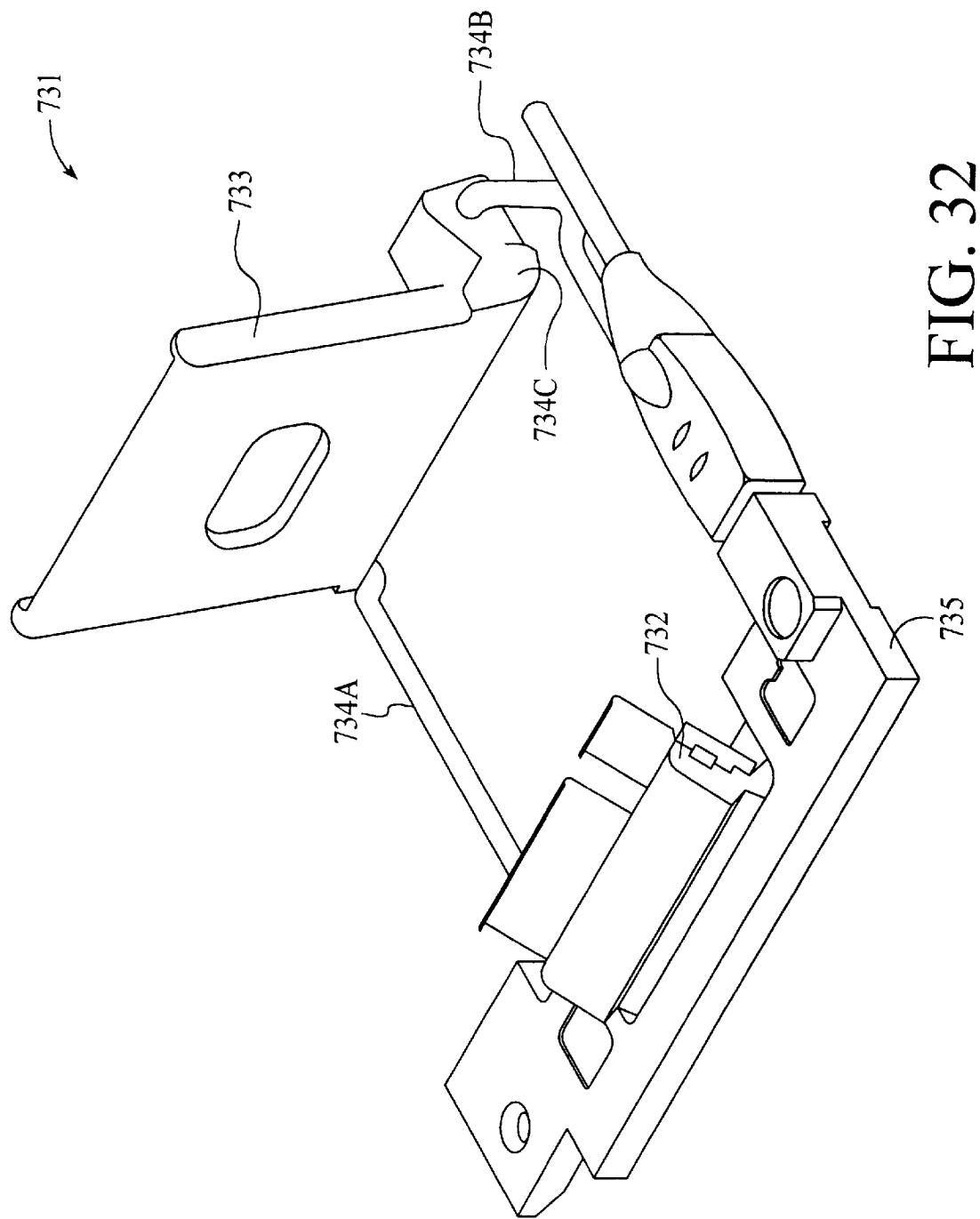
FIG. 32 shows an example of another embodiment of a connection and support docking member which may be used with a collapsible keyboard in one embodiment of the present invention.

FIG. 32 shows an alternative embodiment for a connector assembly according to one embodiment of the present invention. In this example, an electrical docking port 732 is rotatably positioned in a housing 735 which is secured in one embodiment on the left interior keyboard section at the top of the frame 210. Posts 734a and 734b are slidably disposed within channels of the housing 735 and may be extended out away from the frame 210. These posts 734a and 734b are coupled to a support 733 which may be rotated upwardly away from the posts. The support 733 is used to hold a PDA which may be electrically docked with a connector 732. A curved surface 734c may be used on the support 733 to lock the posts into a position to keep the support 733 in a substantially vertical position.

Another embodiment of a keyboard assembly includes a method of automatically turning on an information appliance when the information appliance (e.g. a Palm Pilot or other personal digital assistant (PDA) which uses the Palm OS) is mounted to the keyboard. In order for the keyboard to be used with an information appliance in this embodiment, a software driver must be active (on the information appliance) for the information appliance to recognize the keyboard inputs. For several reasons, however, this software driver is not always active for many information appliances (e.g. PDAs which use the Palm OS). For instance, the software driver can go to an inactive or "sleep" mode to reduce power consumption. Therefore, the software driver must be activated before any keyboard input is initiated. Once the driver is inactivated, signals from the keyboard are not properly received by the PDA. In one situation, the software driver must be activated when the information appliance is first connected to the keyboard. In another situation, the software driver must be activated after the information appliance automatically turns off while connected to the keyboard and must be awakened. The software driver is automatically disabled when the information appliance is turned off. Normally when this driver is disabled and the information appliance is also off, it is not possible to reactivate (e.g. turn on) the information appliance by pressing a key on the keyboard. An embodiment of the invention allows the pressing of a key in this case to reactivate the information appliance.

Upon connection to the keyboard, the information appliance is turned on, if in an off state, and the software driver is activated. In one embodiment, a sequence of events is as follows:

1. Connecting the information appliance applies power to the keyboard electronics. This power is available from the information appliance whether the information appliance is on or off;
2. Upon receiving power for the first time, keyboard electronics sends a "hot sync" signal to the information appliance (in this case a PDA using the Palm OS). The hot sync signal, as used with a Palm OS device, is a control signal which is used to cause the PDA to perform some operation (e.g. transfer data from one device to another device). Normally, this hot sync signal is not used by a peripheral's software driver and is not interrupted by the driver.
3. Upon receiving the hot sync signal, the information appliance turns on, if in an off state, and receives the signal.
4. The keyboard's software driver intercepts this signal, then pauses any activity on the information appliance.
5. The keyboard electronics send an ID code immediately after sending the hot sync signal.
6. The software driver having been activated and in listen mode, detects the keyboard ID code and determines that a keyboard is attached.
7. The handshake activity is completed and the keyboard's now active driver processes the keyboard inputs.

When the information appliance has gone into sleep mode while plugged into the keyboard (after a period of inactivity), the information appliance may be turned on and the keyboard's software driver activated by pressing any key on the keyboard. In one embodiment, a sequence of events that causes this to happen, is as follows:

1. The keyboard electronics goes into sleep mode after the information appliance goes into sleep mode. The keyboard electronics is able to monitor any key activity in this mode.
2. User presses any key on the keyboard (while the PDA is in a sleep mode).
3. Keyboard electronics detects the key press, stores a key code into a buffer, and sends a "hot sync" signal to information appliance.
4. Upon receiving the hot sync signal, the information appliance turns on and receives the signal.
5. The keyboard's software driver intercepts this signal, then pauses any activity on the information appliance.
6. The keyboard electronics sends an ID code immediately after sending the hot sync signal.
7. The keyboard's software driver having been activated and in listen mode, detects the keyboard ID code and determines a keyboard is attached.
8. The handshake activity is completed and the keyboard's now active driver processes the key pressed by the user as well as subsequent key presses.

Figure 33:
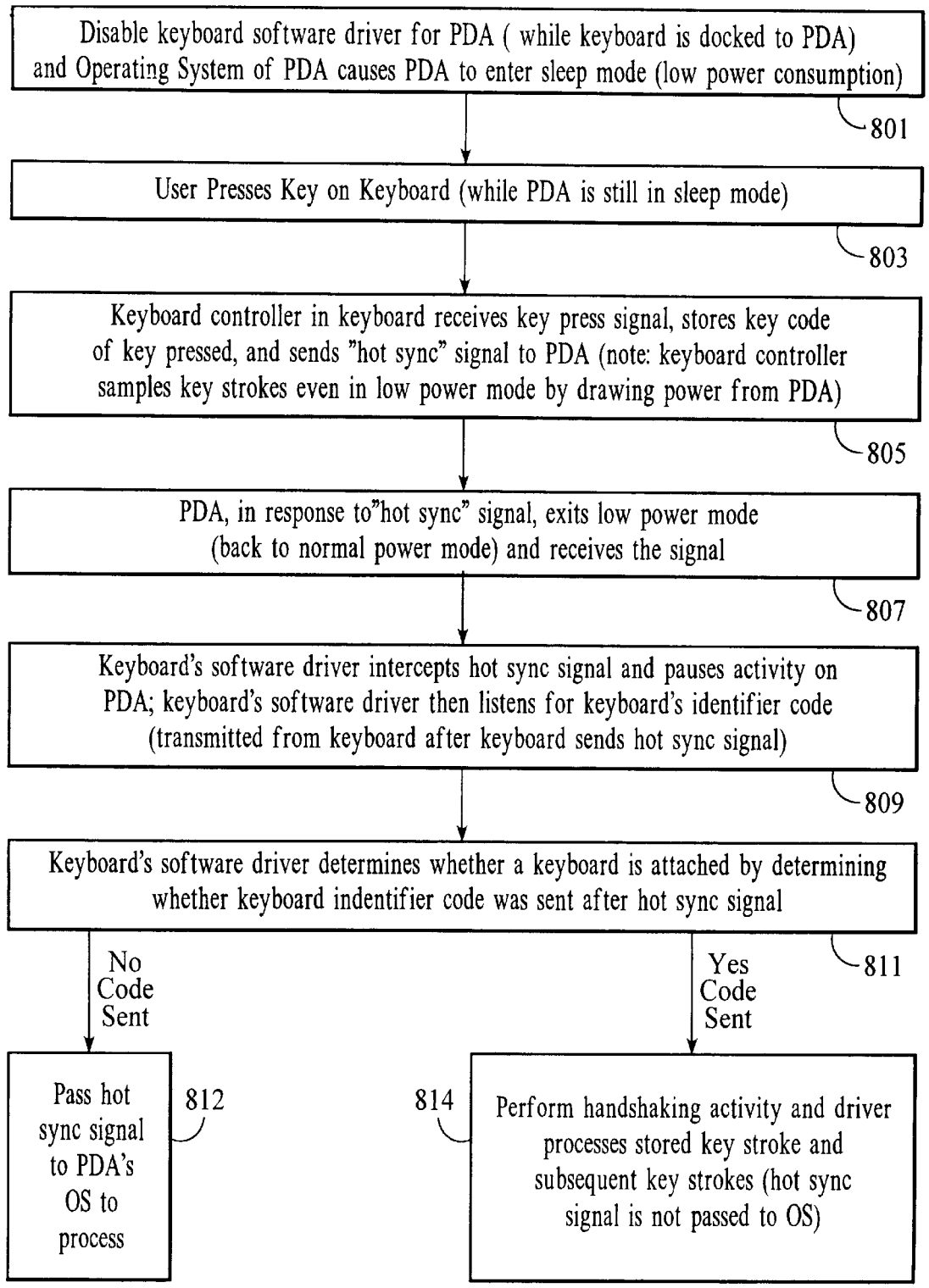
FIG. 33 is a flowchart showing an example of a method in which a collapsible keyboard according to the present invention may reactivate a personal digital assistant which has entered a sleep mode; this reactivation of the personal digital assistant (PDA) occurs by pressing a key on the keyboard after a software driver for the keyboard on the PDA has been deactivated according to one embodiment of the present invention.

The above keyboard electronic activity is preferably controlled by a single keyboard controller chip. FIG. 33 shows an example of the method described here. FIG. 33 shows one method in which a keyboard which is connected to a PDA may by used to reactivate the PDA after is has gone to sleep and while the keyboard is still attached to the PDA. Operation 801 involves the disabling of the keyboard software driver for the PDA while the keyboard is docked to the PDA. Also, the operating system of the PDA causes the PDA to enter a sleep mode in which less power is consumed. In operation 803, a user presses a key on the keyboard while the PDA is still on the sleep mode. In response to this key press, in operation 805, the keyboard controller in the keyboard receives the key press signal and stores the key code of the key press and sends a hot sync signal to the PDA. Note that the keyboard controller, even in the low power state, is sampling keystrokes, and this may be done by drawing power from the PDA. Alternatively, a small battery in the keyboard may provide power for this activity. In operation 807, the PDA, in response to the hot sync signal, exits the low power mode and receives the signal. In operation 809, the keyboard's software driver intercepts this hot sync signal and pauses activity on the PDA. Then the keyboard's software driver listens for the keyboard's identifier code which is transmitted from the keyboard after the keyboard sends the hot sync signal. In operation 811, the software driver determines whether a keyboard is attached by determining whether the keyboard identifier code has been sent after the hot sync signal. If no keyboard identifier code has been sent, then processing proceeds to operation 812 in which the hot sync signal is passed to the PDA's operating system in order to process the hot sync signal. This may, for example, represent the attachment of a different device to the PDA rather than the keyboard. If, on the other hand, a keyboard identifier code has been sent from the keyboard to the PDA, then in operation 814, the handshaking activity is completed and the keyboard software driver processes the stored keystroke and subsequent keystrokes and the hot sync signal is not processed further by the PDA.

In order to operate similarly for other types of information appliances, additional circuitry (hot sync initiate circuitry, HSIC) may be required. This is due to the fact that other information appliances do not provide enough power in an off state to power on the keyboard controller chip. The HSIC is only used for the first situation where the information appliance is initially plugged into the keyboard. The HSIC requires lower power to provide a hot sync signal. Once the information appliance is turned on with the HSIC hot sync signal, enough power is provided to the keyboard controller chip. Then the keyboard controller chip takes over and operates as described above.

A specific embodiment concerning the use of a foldable keyboard with the Palm OS will now be described. When power is applied for the first time to the keyboard, an encoder circuit will wait for 500 milliseconds and then produce a hot sync pulse (maximum duration: 200 milliseconds), irrelevant of the state of the RTS line. As soon as any state change lasting over 2 milliseconds is detected on the RTS line, the hot sync pulse will be terminated.

The encoder circuit (e.g. a keyboard controller) will then wait for the RTS line to become active (high). If RTS transitions to the active (high) state while the hot sync pulse is also active (high), or within 1.5 seconds after the hot sync pulse, the encoder circuit will send a two-byte identification packet, 3 to 5 milliseconds after the RTS line transitions to the active (high) state and remains active (high).

When the software driver for the keyboard detects a hot sync pulse while the serial port is active, it should deactivate (close) the port, wait for 2 milliseconds, and immediately activate (reopen) the serial port. This situation can only be encountered on insertion of the unit onto the keyboard connector (or totally erroneous operations of both the driver and the encoder circuit, in which case both will recover after a keypress or, possibly, removal and reinsertion of the Palm). If the serial port was deactivated (closed) when the hot sync pulse arrived, it is not required to deactivate (close) the serial port (providing considerable savings in response time).

Following successful handshaking, the encoder circuit will start normal operations, transmitting down and up codes for the keypresses. If there are no more keys pressed, the last up code will be doubled.

If RTS line has not activated within 1.5 seconds, the encoder circuit will repeat the hot sync pulse. Up to three (3) pulses will be produced. If the host has not responded with activation of the RTS line (total wait time of 5.1 S=200 mS×3+1.5 S×3), the encoder circuit will operate in an extra-low power state until the RTS line becomes active. During this extra-low power state the keypresses will not initiate hot sync pulses, and continuous keypress will not create any additional power drain.

When the RTS line becomes active, the encoder circuit will exit an extra-low power mode, and send a two-byte identification packet, 3 to 5 milliseconds after the RTS transition.

The purpose of the hot sync pulse on power-up is to wake up the host and to activate the driver or shutdown totally if the driver is not present, even if a key is pressed, in order to conserve power.

If the encoder circuit is operating in normal mode (it has been able to establish communications since the power-up), and RTS inactive state is encountered when the encoder circuit needs to transmit keypress to the host, the hot sync procedure will be repeated. Hot sync line will be activated up to three (3) times until the RTS line becomes active or the encoder circuit will shift to an extra-low power mode.

Timing and transmission of the two-byte identification packet in this case is exactly the same as in the "first power-up" case.

The purpose of the hot sync pulse on keypress is to wake up the host and the driver, or shutdown totally if the driver is not present, even if a key is pressed, in order to conserve power. Driver may deactivate the serial port at any time in order to conserve the power. Wake up from the keypress is instantaneous, transparent to the user.

If no keys have been pressed for a period of 300 milliseconds, then the encoder circuit will enter a low-power state. The RTS line can be negated (set to a low level) any time after this 300-millisecond interval; without generating any additional activity from the encoder circuit.

However, if RTS line is deactivated prior to the end of the 300-millisecond interval, the hot sync line will be activated up to three (3) times until the RTS line becomes active, or the encoder circuit will shift to an extra-low power mode. If RTS line returns to the active (high) state, the encoder will send a two-byte identification packet and re-send all of the bytes transmitted to the host during the interval prior to the deactivation of the RTS (not exceeding 300 milliseconds).

If transmissions to the host continued for more than 300 milliseconds (with no idle periods of 300 milliseconds or more), while the RTS line was continuously active (high), then no re-send operations will be initiated even if RTS line goes inactive in the middle of transmission. In this case the hot sync handshaking will be initiated, and transmission will commence from the point where it was interrupted.

This situation can only occur due to manual intervention of the user (to remove the driver), slow response from the Palm OS, or erroneous operation of the driver. Recovery is immediate, but some keystrokes may be lost. It is preferable to lose some characters rather than automatically re-introduce (possibly) a long string of characters.

In the preceding detailed description, the invention is described with reference to specific embodiments thereof. It will, however, be evident that various modifications and changes may be made thereto without departing from the broader spirit and scope of the invention as set forth in the claims. The specification and its drawings are, accordingly, to be regarded in an illustrative rather than a restrictive sense.

What is claimed is:

1. A keyboard assembly comprising:
    four keyboard sections, each keyboard section hingedly connected to an adjacent section, said keyboard sections foldable with respect to each other between a folded position and an unfolded position, said four keyboard sections being generally coplanar when in said unfolded position and stacked when in said folded position, each of said four keyboard sections including a frame, each frame having a side wall shaped to nest with an adjacent side wall when said keyboard sections are in said folded position.

2. The keyboard assembly of claim 1, wherein said side walls and at least two of said frames form a self-enclosed housing for said keyboard assembly in said folded position.

3. The keyboard assembly of claim 2 wherein said four keyboard sections include a first frame, a second frame, a third frame, and a fourth frame;
    a single hinge connecting said second and said third frames;
    a first double hinge connecting said first and said second frames, said first double hinge including a first hinge member; and
    a second double hinge connecting said third and said fourth frames, said second double hinge including a second hinge member;
    said first hinge member and said second hinge member are shaped to cooperate with each other to form one side of said self-contained housing.

4. The keyboard assembly of claim 3 wherein said first hinge member and said second hinge member releasably lock together when said keyboard sections are in said folded position.

5. A keyboard assembly comprising:
    a first section having a first frame and a first plurality of keys, said first plurality of keys coupled to a first base, said first base is slidable relative to said first frame;
    a second section coupled to said first section, said second section having a second frame and a second plurality of keys coupled to said second frame, said first plurality of keys and said first base are laterally movable relative to said second plurality of keys;
    a flexible circuit including a first panel disposed between said first plurality of keys and said first base, said flexible circuit further including a bridge portion extending from said first panel and between said second frame and said second plurality of keys; and
    a flexible guard piece mounted over said bridge portion, said flexible guard piece having a first portion attached to said first frame and a second portion extending from said first portion and between said bridge portion and said second plurality of keys, wherein said bridge portion is slidable under said flexible guard piece when said first section and said second section are folded toward each other.

6. A keyboard assembly as in claim 5 further comprising a bottom flexible guard piece mounted under said bridge portion above said first frame and said second frame and being fixedly attached to said bridge portion and to said second frame.

7. A keyboard assembly comprising:
   four keyboard sections, said keyboard sections foldable with respect to each other between a folded position and an unfolded position, said four keyboard sections being generally coplanar when in said unfolded position and stacked when in said folded position;
   a connector associated with one of said keyboard sections, said connector adapted for electrical connection to an information appliance; and
   a slidable support coupled to at least one of said keyboard sections, said slidable support providing a docking connection for said information appliance,
   wherein said connector is on a telescoping frame wherein said telescoping frame is movable from a hidden position to an extended position.

8. The assembly of claim 7 wherein said telescoping frame includes a support leg attached to said telescoping frame, wherein said support leg holds said connector in a selected position when said frame is moved to said extended position.

9. A keyboard assembly comprising:
   a first section having a first frame and a first plurality of keys, said first plurality of keys coupled to a first base, said first base is slidable relative to said first frame;
   a second section coupled to said first section, said second section having a second frame and a second plurality of keys coupled to said second frame, said first plurality of keys and said first base are laterally movable relative to said second plurality of keys; and
   a flexible circuit including a first panel disposed between said first plurality of keys and said first base, said flexible circuit further including a bridge portion extending from said first panel and between said second frame and said second plurality of keys,
   wherein said keyboard is collapsible.

10. The keyboard assembly of claim 9, wherein said bridge portion comprises at least one loop.

11. A keyboard assembly comprising:
    a first section having a first frame and a first plurality of keys, said first plurality of keys coupled to a first base, said first base is slidable relative to said first frame;
    a second section coupled to said first section, said second section having a second frame and a second plurality of keys coupled to said second frame, said first plurality of keys and said first base are laterally movable relative to said second plurality of keys;
    a flexible circuit including a first panel disposed between said first plurality of keys and said first base, said flexible circuit further including a bridge portion extending from said first panel and between said second frame and said second plurality of keys; and
    a first flexible guard piece disposed over said first frame and said second frame and being fixedly coupled to one of said first frame and said second frame.

12. A keyboard assembly as in claim 11 wherein said keyboard assembly is foldable and said first section is rotatably coupled to said second section and said bridge portion moves relative to at least one of said first frame and said second frame as said first section is rotated relative to said second section.

13. A keyboard assembly as in claim 11 further comprising:
    a second flexible guard piece disposed over said first frame and said second frame and being fixedly coupled to one of said first frame and said second frame, and wherein said bridge portion comprises at least one loop.

14. A keyboard assembly as in claim 13 wherein one of said first flexible guard piece or said second flexible guard piece is fixedly coupled to said bridge portion.

15. A keyboard assembly as in claim 14 wherein said keyboard assembly is foldable and said first section is rotatably coupled to said second section and said bridge portion moves relative to at least one of said first frame and said second frame as said first section is rotated relative to said second section.

16. A keyboard assembly as in claim 15 wherein at least one hinge couples said first section to said second section and wherein said bridge portion and said first flexible guard piece and said second flexible guard piece extend over said at least one hinge.

17. A keyboard assembly as in claim 16 wherein said at least one hinge comprises a double hinge.

18. A keyboard assembly comprising:
    a first keyboard section;
    a second keyboard section foldable over said first keyboard section in a folding direction, wherein said keyboard assembly is foldable between a folded position and an unfolded position; and
    a mechanism that keeps said keyboard assembly generally flat when in an unfolded position, said mechanism providing resistance against folding of said first and second keyboard sections in a direction opposite said folding direction while allowing folding in said opposite direction when sufficient force is applied to overcome said resistance, wherein said mechanism includes a hinge, and said hinge couples said first keyboard section to said second keyboard section, and wherein said hinge includes a hinge member extending between said first keyboard section and said second keyboard section, said first keyboard section includes a first frame, said first frame includes a hinge element which contains an axle and a ridge, and said ridge engages said hinge member to provide said resistance against folding in said opposite direction.

19. The keyboard assembly of claim 18 wherein said ridge moves past said hinge member when sufficient force is applied to overcome said resistance.

20. The keyboard assembly of claim 19 wherein said keyboard assembly can be restored to said generally flat unfolded position by moving said ridge back to its position engaged with said hinge member.

21. A method for activating a personal digital assistant (PDA) from a low power state, in which a software driver for a peripheral device is disabled in the low power state, said peripheral device being coupled to said PDA and said peripheral device being used to activate said PDA, said method comprising:
    transmitting a control signal from said peripheral to said PDA;
    storing a peripheral data for later transmission to said PDA;
    transmitting a peripheral identifier to said PDA;
    transmitting said peripheral data to said PDA.

22. A method as in claim 21 wherein said method is performed entirely by said peripheral.

23. A method as in claim 22 wherein said peripheral is a collapsible keyboard and said peripheral data is a key code identifying a key which was pressed and wherein pressing said key causes said control signal to be transmitted and wherein said peripheral data is transmitted after first transmitting said control signal and then transmitting said peripheral data.

24. A method as in claim 23 wherein said control signal is a hot sync signal used in PDAs which run the Palm operating system.

25. A method as in claim 21 further comprising:
receiving said control signal on said PDA and entering a high power state on said PDA;
intercepting, by said software driver, said control signal;
determining whether said peripheral identifier has been received by said PDA;
receiving said peripheral data after determining said peripheral identifier has been received.

26. A method as in claim 25 wherein said intercepting prevents an operating system on said PDA from acting on said control signal.

27. A method as in claim 26 wherein if said peripheral data is not received within a predetermined period of time then said control signal is passed to said operating system for processing by said operating system.

28. A keyboard assembly comprising:
a plurality of keyboard sections, said keyboard sections foldable with respect to each other between a folded position and an unfolded position, said keyboard sections being generally coplanar when in said unfolded position and stacked when in said folded position, wherein said plurality of keyboard sections comprises a first keyboard section, a second keyboard section, a third keyboard section, and a fourth keyboard section;
at least one hinge connecting said second and said third keyboard sections;
a first double hinge connecting said first and said second keyboard sections, said first double hinge including a first hinge member; and
a second double hinge connecting said third and said fourth keyboard sections, said second double hinge including a second hinge member, wherein said keyboard sections each include a keyboard frame, said keyboard frames, said first hinge member, and second hinge member cooperating to form a self-contained housing when said keyboard sections are in said folded position, and wherein said first double hinge includes an outer pin connecting said first keyboard section to said first hinge member and an inner pin connecting said second keyboard section to said first hinge member;
said second double hinge includes a inner pin connecting said third keyboard section to said second hinge member and an outer pin connecting said fourth keyboard section to said second hinge member;
said at least one hinge includes a central pin connecting said second keyboard section and said third keyboard section;
wherein when said keyboard sections are in said folded position, said inner pins of said first and said second double hinges and said central pin of said at least one hinge are all coplanar.

29. A keyboard assembly comprising:
four keyboard sections, said keyboard sections foldable with respect to each other between a folded position and an unfolded position, said four keyboard sections being generally coplanar when in said unfolded position and stacked when in said folded position;
a connector associated with one of said keyboard sections, said connector adapted for electrical connection to an information appliance;
a slidable support coupled to at least one of said keyboard sections, said slidable support providing a docking connection for said information appliance; and
a telescoping frame movable from a hidden position to an extended position, and a support member operatively associated with said telescoping frame, said support member being biased by said telescoping frame to a deployed position when said telescoping frame is in said extended position.

30. A keyboard assembly comprising:
a plurality of keyboard sections, said keyboard sections foldable with respect to each other between a folded position and an unfolded position, said keyboard sections being generally coplanar when in said unfolded position and stacked when in said folded position, wherein said plurality of keyboard sections comprises a first keyboard section, a second keyboard section, a third keyboard section, and a fourth keyboard section;
at least one hinge connecting said second and said third keyboard sections;
a first double hinge connecting said first and said second keyboard sections, said first double hinge including a first hinge member; and
a second double hinge connecting said third and said fourth keyboard sections, said second double hinge including a second hinge member,
wherein said first hinge member and said second hinge member are shaped to fit together to form one side of a self-contained housing.

* * * * *